(12) United States Patent
Bechtel et al.

(10) Patent No.: US 9,298,815 B2
(45) Date of Patent: Mar. 29, 2016

(54) SYSTEM FOR PROVIDING AN INTERFACE FOR COLLABORATIVE INNOVATION

(75) Inventors: Michael E. Bechtel, Naperville, IL (US); Sean R. Kampas, Hanover Park, IL (US)

(73) Assignee: Accenture Global Services Limited, Dublin (IE)

( * ) Notice: Subject to any disclaimer, the term of this patent is extended or adjusted under 35 U.S.C. 154(b) by 750 days.

(21) Appl. No.: 12/036,012

(22) Filed: Feb. 22, 2008

(65) Prior Publication Data

US 2009/0217175 A1    Aug. 27, 2009

(51) Int. Cl.
| | |
|---|---|
| G06F 17/30 | (2006.01) |
| G06Q 10/06 | (2012.01) |
| G06Q 10/10 | (2012.01) |
| H04N 21/4788 | (2011.01) |
| H04L 12/58 | (2006.01) |

(52) U.S. Cl.
CPC .... G06F 17/30716 (2013.01); *G06Q 10/06316* (2013.01); *G06Q 10/101* (2013.01); *H04L 51/04* (2013.01); *H04N 21/4788* (2013.01)

(58) Field of Classification Search
CPC .......... G06Q 10/101; G06Q 10/06316; H04L 51/04; H04N 21/4788; G06F 17/30716
USPC ..................... 715/751, 853; 705/12, 300, 301
See application file for complete search history.

(56) References Cited

U.S. PATENT DOCUMENTS

| | | |
|---|---|---|
| 5,251,294 A | 10/1993 | Abelow |
| 5,628,009 A | 5/1997 | Kikuta et al. |
| 5,812,773 A * | 9/1998 | Norin .................. H04L 12/18 709/201 |
| 5,835,085 A | 11/1998 | Eick et al. |
| 5,878,214 A | 3/1999 | Gilliam et al. |
| 6,072,591 A * | 6/2000 | Harrington .............. H04N 1/52 358/1.9 |

(Continued)

FOREIGN PATENT DOCUMENTS

| | | | | |
|---|---|---|---|---|
| CH | 101515282 A * | 8/2009 | ........ | G06F 17/30716 |
| EP | 1 286 276 A1 | 2/2003 | | |

(Continued)

OTHER PUBLICATIONS

European Search Report for counterpart European Patent Application No. EP 09002450 dated Jul. 20, 2009.

(Continued)

*Primary Examiner* — Ece Hur
(74) *Attorney, Agent, or Firm* — Brinks Gilson & Lione

(57) ABSTRACT

A system is described for providing an interface for collaborative innovation. The system may include a memory, an interface, and a processor. The memory may store an item, primary responses, secondary responses and ratings. The interface may communicate with users and a content provider and may allow the users to create primary responses associated with the item, create secondary responses associated with the primary responses and rate the primary and secondary responses. The processor may receive the item from the content provider and provide the interface to the users. The processor may receive the primary and secondary responses from the users, and may display a graphical hierarchical representation of the item and the responses. The processor may allow the users to rate the primary and secondary responses through the graphical hierarchical representation. The processor may provide the primary and secondary responses to the content provider, ordered based on the ratings.

23 Claims, 22 Drawing Sheets

(56) References Cited

U.S. PATENT DOCUMENTS

| | | | |
|---|---|---|---|
| 6,112,186 A | 8/2000 | Bergh et al. | |
| 6,275,811 B1 | 8/2001 | Ginn | |
| 6,484,190 B1 | 11/2002 | Cordes et al. | |
| 6,681,369 B2 | 1/2004 | Meunier et al. | |
| 6,856,986 B1 | 2/2005 | Rossides | |
| 6,892,178 B1* | 5/2005 | Zacharia | G06Q 10/04 705/7.29 |
| 7,181,438 B1 | 2/2007 | Szabo | |
| 7,219,307 B2 | 5/2007 | Senay | |
| 7,296,023 B2 | 11/2007 | Geyer et al. | |
| 7,305,419 B1 | 12/2007 | Cosby et al. | |
| 7,356,772 B2 | 4/2008 | Brownholtz et al. | |
| 7,370,285 B1 | 5/2008 | Nickerson et al. | |
| 7,403,910 B1 | 7/2008 | Hastings et al. | |
| 7,458,019 B2* | 11/2008 | Gumz | G06F 9/44526 707/999.101 |
| 7,480,696 B2 | 1/2009 | Kirkland et al. | |
| 7,519,562 B1* | 4/2009 | Vander Mey | G06Q 30/02 705/12 |
| 7,533,034 B2 | 5/2009 | Laurin et al. | |
| 7,548,873 B2 | 6/2009 | Veeningen et al. | |
| 7,565,534 B2 | 7/2009 | Starbuck et al. | |
| 7,657,404 B2 | 2/2010 | Thurner | |
| 7,756,797 B2 | 7/2010 | Icenoggle | |
| 7,765,176 B2* | 7/2010 | Simmons | G06F 17/30241 706/45 |
| 7,774,790 B1* | 8/2010 | Jirman | G06F 11/00 719/318 |
| 7,788,237 B2 | 8/2010 | Voronov et al. | |
| 7,793,219 B1 | 9/2010 | Stratton et al. | |
| 7,822,848 B2 | 10/2010 | Muller et al. | |
| 7,853,880 B2 | 12/2010 | Porter | |
| 7,899,694 B1 | 3/2011 | Marshall et al. | |
| 7,904,510 B2* | 3/2011 | Anderson | G06F 17/24 707/662 |
| 7,953,687 B2* | 5/2011 | Simmons | G06N 5/02 706/45 |
| 7,953,720 B1 | 5/2011 | Rohde et al. | |
| 8,010,480 B2 | 8/2011 | Dave et al. | |
| 8,060,817 B2 | 11/2011 | Goldberg et al. | |
| 8,065,193 B2* | 11/2011 | Bullock | G06Q 10/067 705/26.1 |
| 8,065,253 B2* | 11/2011 | Simmons | G06F 17/30241 706/45 |
| 8,073,733 B1* | 12/2011 | Caland | G06Q 10/00 705/14.4 |
| 8,151,200 B2 | 4/2012 | Roger et al. | |
| 8,161,110 B2 | 4/2012 | Verhaeghe et al. | |
| 8,166,028 B1* | 4/2012 | Reynar | G06F 17/30867 707/732 |
| 8,224,862 B2 | 7/2012 | Sacks | |
| 8,335,504 B2 | 12/2012 | Aaron | |
| 8,341,068 B2 | 12/2012 | Koen et al. | |
| 8,645,516 B2* | 2/2014 | Bechtel | G06F 17/30994 709/203 |
| 8,930,520 B2* | 1/2015 | Bechtel | 709/203 |
| 9,009,601 B2* | 4/2015 | Bechtel | 709/204 |
| 2001/0033296 A1 | 10/2001 | Fullerton et al. | |
| 2001/0047290 A1 | 11/2001 | Petras et al. | |
| 2002/0023144 A1 | 2/2002 | Linyard et al. | |
| 2002/0023271 A1 | 2/2002 | Augenbraun et al. | |
| 2002/0075320 A1 | 6/2002 | Kurapati | |
| 2002/0095305 A1 | 7/2002 | Gakidis et al. | |
| 2003/0036947 A1 | 2/2003 | Smith, III et al. | |
| 2003/0055897 A1* | 3/2003 | Brown | H04L 12/2602 709/205 |
| 2003/0101197 A1 | 5/2003 | Sorensen et al. | |
| 2003/0167443 A1 | 9/2003 | Meunier et al. | |
| 2003/0172025 A1 | 9/2003 | Gallina | |
| 2003/0216962 A1 | 11/2003 | Heller et al. | |
| 2003/0236582 A1* | 12/2003 | Zamir | G11B 27/002 700/94 |
| 2004/0181417 A1 | 9/2004 | Piller et al. | |
| 2004/0186738 A1 | 9/2004 | Reisman | |
| 2004/0205065 A1 | 10/2004 | Petras et al. | |
| 2004/0225577 A1 | 11/2004 | Robinson | |
| 2005/0060222 A1 | 3/2005 | White | |
| 2005/0108103 A1 | 5/2005 | Roberts et al. | |
| 2005/0114781 A1* | 5/2005 | Brownholtz | G06Q 10/107 715/733 |
| 2005/0149622 A1 | 7/2005 | Kirkland et al. | |
| 2005/0159932 A1* | 7/2005 | Thurner | G05B 19/0426 703/2 |
| 2005/0165859 A1 | 7/2005 | Geyer et al. | |
| 2005/0177388 A1 | 8/2005 | Moskowitz et al. | |
| 2005/0228983 A1* | 10/2005 | Starbuck | H04L 63/08 713/151 |
| 2005/0267875 A1 | 12/2005 | Bentley, III | |
| 2005/0283474 A1 | 12/2005 | Francis et al. | |
| 2006/0026502 A1 | 2/2006 | Dutta | |
| 2006/0026509 A1 | 2/2006 | Porter | |
| 2006/0042483 A1* | 3/2006 | Work | G06Q 10/00 101/91 |
| 2006/0053382 A1* | 3/2006 | Gardner | G06F 3/0482 715/764 |
| 2006/0057079 A1 | 3/2006 | Pickover | |
| 2006/0095443 A1 | 5/2006 | Kumar et al. | |
| 2006/0101324 A1 | 5/2006 | Goldberg et al. | |
| 2006/0106627 A1 | 5/2006 | Al-Nujaidi | |
| 2006/0121434 A1 | 6/2006 | Azar | |
| 2006/0136510 A1 | 6/2006 | Voronov et al. | |
| 2006/0218004 A1 | 9/2006 | Dworkin et al. | |
| 2006/0242554 A1* | 10/2006 | Gerace | G06F 17/30867 715/209 |
| 2006/0247943 A1 | 11/2006 | Kapoor | |
| 2006/0286530 A1 | 12/2006 | Forrest et al. | |
| 2006/0294043 A1 | 12/2006 | Taisdeal | |
| 2007/0011204 A1 | 1/2007 | Sorensen et al. | |
| 2007/0033092 A1* | 2/2007 | Iams | G06F 17/30699 705/7.32 |
| 2007/0078670 A1 | 4/2007 | Dave et al. | |
| 2007/0106627 A1 | 5/2007 | Srivastava et al. | |
| 2007/0143128 A1* | 6/2007 | Tokarev | G06Q 10/10 705/347 |
| 2007/0143281 A1 | 6/2007 | Smirin et al. | |
| 2007/0192321 A1* | 8/2007 | Farr | G06F 17/30902 |
| 2007/0219653 A1 | 9/2007 | Martin | |
| 2007/0219958 A1* | 9/2007 | Park | G06F 17/30654 |
| 2007/0226296 A1 | 9/2007 | Lowrance et al. | |
| 2007/0245380 A1 | 10/2007 | Dommer et al. | |
| 2007/0250378 A1 | 10/2007 | Hughes et al. | |
| 2007/0256033 A1 | 11/2007 | Hiler | |
| 2007/0288416 A1* | 12/2007 | Ferguson | G06Q 10/10 706/50 |
| 2007/0288546 A1 | 12/2007 | Rosenberg | |
| 2008/0005101 A1 | 1/2008 | Chandra | |
| 2008/0032723 A1 | 2/2008 | Rosenberg | |
| 2008/0046511 A1 | 2/2008 | Skrenta | |
| 2008/0046953 A1* | 2/2008 | Kossila | G06Q 90/00 725/132 |
| 2008/0082408 A1* | 4/2008 | Santa Ana | G06Q 30/02 705/14.11 |
| 2008/0108036 A1 | 5/2008 | Dom et al. | |
| 2008/0109244 A1* | 5/2008 | Gupta | G06Q 30/02 705/1.1 |
| 2008/0120339 A1 | 5/2008 | Guan et al. | |
| 2008/0133671 A1 | 6/2008 | Kalaboukis | |
| 2008/0172407 A1 | 7/2008 | Sacks | |
| 2008/0189724 A1 | 8/2008 | Tien et al. | |
| 2008/0201159 A1 | 8/2008 | Gabrick et al. | |
| 2008/0208898 A1 | 8/2008 | Salo et al. | |
| 2008/0222279 A1* | 9/2008 | Cioffi | G06Q 10/10 709/223 |
| 2008/0228827 A1 | 9/2008 | Perlman | |
| 2008/0231191 A1 | 9/2008 | Pekarski | |
| 2008/0243807 A1 | 10/2008 | Gaucas et al. | |
| 2008/0261191 A1 | 10/2008 | Woolf et al. | |
| 2008/0270949 A1 | 10/2008 | Liang | |
| 2008/0281610 A1 | 11/2008 | Yoshida et al. | |
| 2008/0288494 A1* | 11/2008 | Brogger | G06Q 30/02 |
| 2008/0288914 A1 | 11/2008 | Schmitter | |
| 2008/0301091 A1 | 12/2008 | Hibbets et al. | |
| 2009/0024910 A1 | 1/2009 | Kamat et al. | |
| 2009/0037414 A1* | 2/2009 | Olivier | G06Q 30/02 |

(56) References Cited

U.S. PATENT DOCUMENTS

| | | | |
|---|---|---|---|
| 2009/0094039 A1 | 4/2009 | MacDonald et al. | |
| 2009/0094219 A1 | 4/2009 | Davis | |
| 2009/0094328 A1 | 4/2009 | Goodman et al. | |
| 2009/0132651 A1 | 5/2009 | Roger et al. | |
| 2009/0144272 A1 | 6/2009 | Adarsh et al. | |
| 2009/0157490 A1 | 6/2009 | Lawyer | |
| 2009/0162824 A1 | 6/2009 | Heck | |
| 2009/0182624 A1* | 7/2009 | Koen | G06Q 10/10 705/37 |
| 2009/0271708 A1 | 10/2009 | Peters et al. | |
| 2009/0292727 A1 | 11/2009 | Powell | |
| 2009/0319436 A1* | 12/2009 | Andra | G06F 17/2785 705/80 |
| 2010/0071000 A1* | 3/2010 | Amento | H04N 7/173 725/39 |
| 2010/0241507 A1* | 9/2010 | Quinn | G06Q 30/02 705/14.42 |

FOREIGN PATENT DOCUMENTS

| | | |
|---|---|---|
| EP | 1286276 A1 | 2/2003 |
| WO | WO 2004/097627 A2 | 11/2004 |

OTHER PUBLICATIONS

First Examiner's Report dated Mar. 7, 2012 for co-pending Canadian Patent Application No. 2,652,734.

United States Patent and Trademark non-final Office Action dated Dec. 17, 2012 for co-pending U.S. Appl. No. 12/036,001.

Notification of Third Office Action, The State Intellectual Property Office of the People's Republic of China, Application No. 200910007397.6, Dec. 8, 2013, 9 pp.

English Translation of the Abstract and portions of "Research on and Implementation of QA Technique based on Forum Data Source," Chinese Master Thesis, Luo Bin, Beijing Jiaotong University, Dec. 31, 2007, 4 pp., http://www.doc88.com/p-643858895701.html.

"Research on and Implementation of QA Technique based on Forum Data Source," Chinese Master Thesis, Luo Bin, Beijing Jiaotong University, Dec. 31, 2007, 7 pp., http://www.doc88.com/p-643858895701.html.

Marwan Abi-Antoun et al., "Differencing and Merging of Architectural Views", pp. 1-40, Dec. 22, 2007, Springer Science + Business Media.

Frank G. Halasz et al., "Notecards in a Nutshell", pp. 45-52, 1987, Intelligent Systems Laboratory, Xerox Palo Alto research Center.

Cliff Lampe et al., "Follow the Reader: Filtering Comments on Slashdot", pp. 1253-1262, Apr. 28-May 3, 2007, CHI 2007 proceedings.

Vbulletin (Distance), Advanced Report Post Management System, (Mar. 8, 2007) http://web.archive.org/web/20071019022335/http://www.vbulletin.org/forum/showthread.php?t-137031, pp. 1-10.

phpBB Academy at Star Trek Guide—Exreaction, Soft Delete (Sep. 2007) http://startrekguide.com/community/viewtopic.pho?f=84&t-3409., pp. 1-9.

RCGroups, Warning Types (Oct. 13, 2007) http://web.archive.org/web/20071013080645/http:/www.rcgroups.com/forums/wlist.pho, pp. 1-4.

Schematic View, 3D Max-Tutorials.com, https://web.archive.org/web/20070731032921/http://www.3dmax-tutorials.com/Schematic_View.html, dated Jul. 31, 2007, 10 pages.

United States Patent and Trademark non-final Office Action dated Apr. 22, 2013 for co-pending U.S. Appl. No. 12/489,824.

\* cited by examiner

SYSTEM FOR PROVIDING AN INTERFACE FOR COLLABORATIVE INNOVATION

TECHNICAL FIELD

The present description relates generally to a system and method, generally referred to as a system, for providing an interface for collaborative innovation, and more particularly, but not exclusively, to providing an interface for enabling collaborative innovation processes within an organization.

BACKGROUND

Collaborative software may allow users to cooperatively build off an initial idea or topic. The topic may continually evolve as additional users provide insight to the topic; however, the collaborative software may only be capable of displaying linear revisions of the topic. For example, a collaborative software system may provide users with an interface for creating and expanding articles on topics. The interface may provide users with the most recent version of the article, and may allow the users to post modifications to the most recent version of the article. However, in some instances there may be topics where there is not one clear answer to a given question. There may be competing, and equally valid, opinions to what the content of such an article should contain.

SUMMARY

A system for providing an interface for collaborative innovation may include a memory, an interface, and a processor. The memory may be connected to the processor and the interface and may store an item, primary responses, secondary responses and ratings. The interface may communicate with users and a content provider. The interface may allow the users to create primary responses associated with the item, create secondary response associated with the primary responses and rate the primary and secondary responses. The processor may receive the item from the content provider and provide the interface to the one or more users via the interface. The processor may receive the primary and secondary responses from the users via the interface, and may display a graphical hierarchical representation of the item, the primary responses and the secondary responses. The processor may allow the users to rate the primary and secondary response through the graphical hierarchical representation. The processor may order the primary and secondary responses based on the ratings and may provide the ordered primary and secondary responses to the content provider.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, may relate to providing an interface for collaborative innovation, and more particularly, but not exclusively, to providing an interface for enabling collaborative innovation processes within an organization. The principles described herein may be embodied in many different forms.

The system may provide an interface to one or more users within an organization. The interface may allow the users to create one or more ideas associated with an initial idea. The initial idea may be a topic or issue of relevance to the organization. The interface may also allow the users to rate the one or more ideas. The system may allow any number of ideas to be associated with the initial idea and/or with the other ideas, thereby allowing for multiple concurrent revisions of each initial idea. The system may provide an interface displaying a graphical representation of the ideas and the associations between the ideas to the users. The graphical representation may allow the users to easily determine where to add an additional idea to an existing idea. The system may order the ideas based on the ratings received for the ideas, and may display the ordered ideas to the creator of the initial idea. The creator of the initial idea may use the ordered list of ideas to efficiently determine the most valuable ideas associated with the initial idea.

Figure 1:
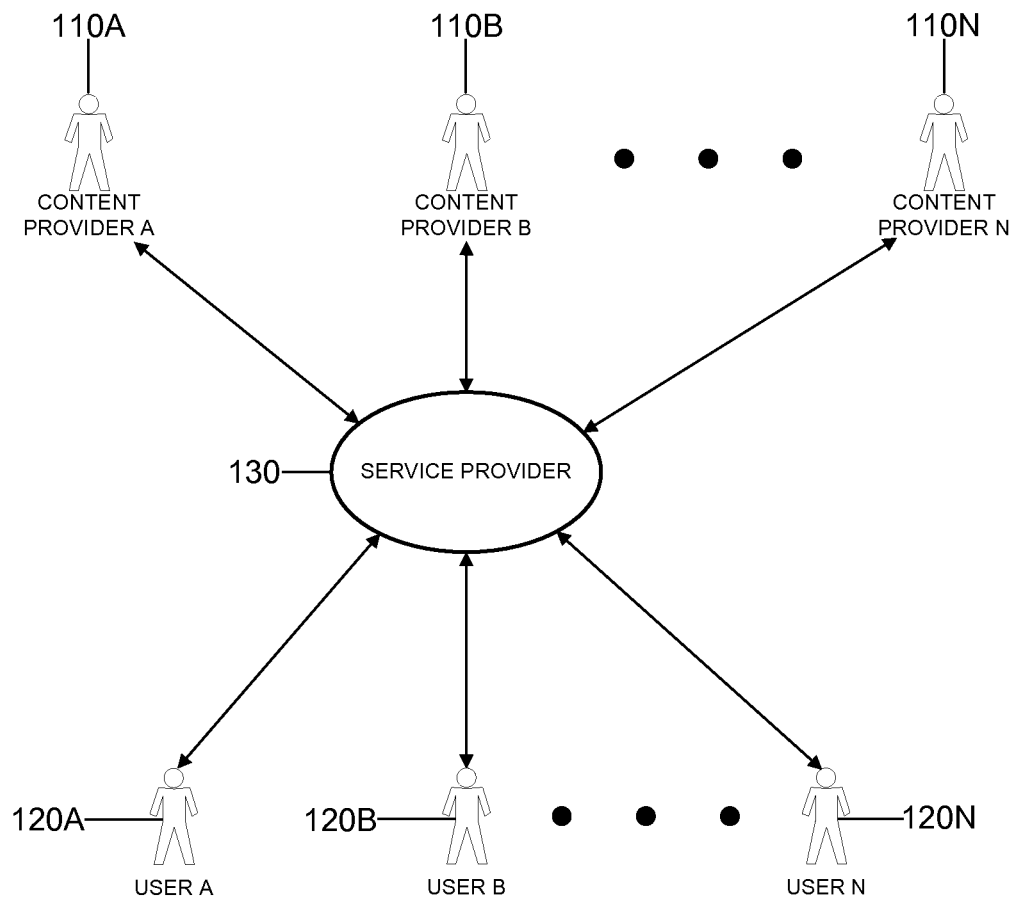
FIG. 1 is a block diagram of a general overview of a system for providing an interface for collaborative innovation.

FIG. 1 provides a general overview of a system 100 for providing an interface for collaborative innovation. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as decision making personnel of an organization, a service provider 130, such as a collaborative innovation interface provider, and one or more users 120A-N, such as employees of the organization or other parties authorized to use the service. The service provider 130 may provide an interface for collaborative innovation. Collaborative innovation may be the process of building and refining ideas in a collaborative environment. The users 120A-N may provide ideas, refinements of ideas, rating of ideas, or generally any data that may assist the collaborative innovation process. The content providers 110A-N may provide initial items, or seed ideas, to begin the collaborative process and may review the results of the collaborative innovation process. Alternatively or in addition one or more of the users 120A-N may be authorized to provide initial items. One or more of the users 120A-N and/or the content providers 1110A-N may be system administrators, also referred to as administrators.

In operation the service provider 130 may provide the content providers 110A-N with an interface for identifying an initial idea. The initial idea may be question whose answer is of value to one of the content providers 110A-N, such as the content provider A 110A. For example, an initial question may be "what activities would you like the social committee to sponsor?" Alternatively or in addition the initial idea may be a statement of opinion or fact. The service provider 130 may provide the content provider A 110A with an interface for identifying which users 120A-N the initial idea should be displayed to and/or which users 120A-N should be allowed to rate the idea or enhance the idea. A enhancement of an initial idea may be referred to as a response, revision, or primary response. An enhancement of an primary response may be referred to as a secondary response, and so on. The system 100 may allow the content provider A 110A to select one or more users 120A-N, or a group of users 120A-N.

Once an initial question has been created the service provider 130 may send a notification to the one or more users 120A-N that a new question is available, such as, such as by emailing the users 120A-N. The service provider 130 may provide an interface displaying the initial ideas in the system 100 to the users 120A-N. The interface may allow the users 120A-N to filter the initial ideas based on one or more characteristics of the ideas. The users 120A-N may use the interface to select an initial idea. The interface for viewing and filtering initial ideas may be discussed in more detail in FIG. 4. If a user A 120A selects an initial idea, the service provider 130 may provide the user A 120A with an interface displaying detailed information regarding the initial idea. The interface displaying detailed initial idea information may be discussed in more detail in FIG. 5.

The service provider 130 may provide the users 120A-N with an interface for creating enhancements to the ideas and an interface for commenting on and rating ideas. The interface may display all of the ideas innovated from the initial item to the users 120A-N and may allow the users 120A-N to select and rate an idea. In the system 100, the display of all the ideas innovated from the initial item may be referred to as the collaborative innovation view. The initial item and the ideas innovated from the initial item may be represented in the collaborative innovation view as a graphical hierarchical structure. The graphical hierarchical structure may allow the users 120A-N to easily navigate, and rate, the ideas. The interface may further allow the users 120A-N to search and sort the ideas, based one or more idea characteristics, such as the title of the idea. In the system 100 an idea which enhances an original idea or another idea may be referred to as a grape idea, or simply a grape. The interface for enhancing and rating ideas may be discussed in more detail in FIG. 6.

Once the period of time allocated to collaborating on the initial idea has expired, the service provider 130 may notify the content provider A 110A that the collaborative innovation process has completed. The service provider 130 may provide the content provider A 110A with an interface for viewing the results of the collaborative innovation process. The results may be displayed as an ordered list of ideas generated by the users 120A-N during the innovation process. The ideas may be ordered based on the ratings the ideas received from the users 120A-N. The service provider 130 may provide the content provider A 110A with an interface for filtering the results based on one or more characteristics of the users 120A-N who rated the ideas. In the system 100 the ideas receiving the highest ratings may be referred to as wine ideas, or simply wine. The interface for viewing collaborative innovation results may be discussed in FIG. 7.

The service provider 130 may provide the users 120A-N with an interface for viewing a summary of their activity with the service provider 130. The summary may include one or more graphs displaying the activity of the users 120A-N, such as a pie graph, a bar graph, or generally any graph capable of reporting the activity of the users 120A-N. The interface may also allow the users 120A-N to view or modify their user profile. The interface for providing user activity data may be discussed in more detail in FIG. 8.

The service provider 130 may provide an administrator interface to authorized content providers 110A-N and or users 120A-N, such as the content provider A 110A. The administrator interface may allow the content provider A 110A to add and/or remove users 120A-N and set the permissions of users 120A-N. The permissions may include creating initial ideas, creating follow-up ideas, rating ideas, viewing ideas, or generally any permission that may be set in the system 100. The administrator interface is discussed in more detail in FIG. 9.

Figure 2:
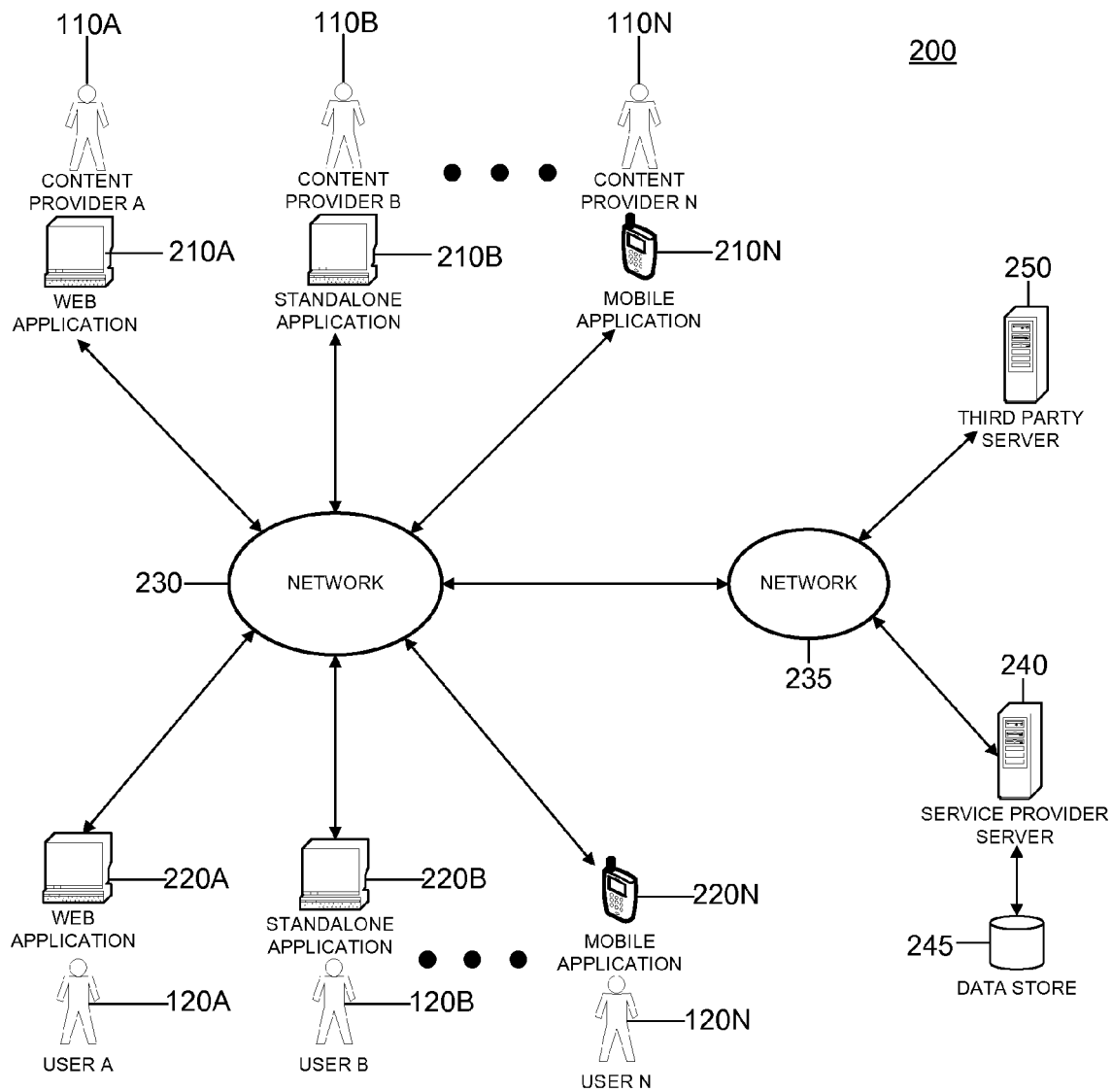
FIG. 2 is a block diagram of a network environment implementing the system of FIG. 1 or other systems for providing an interface for collaborative innovation.

FIG. 2 provides a simplified view of a network environment 200 implementing the system of FIG. 1 or other systems for providing an interface for collaborative innovation. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be client applications of the content providers 110A-N. The system 200 may also include one or more web applications, standalone applications, mobile applications 220A-N, which may be client applications of the users 120A-N. The web applications, standalone applications and mobile applications 210A-N, 220A-N, may collectively be referred to as client applications 210A-N, 220A-N. The system 200 may also include a network 230, a network 235, the service provider server 240, a data store 245, and a third party server 250.

Some or all of the service provider server 240, and third-party server 250 may be in communication with each other by way of network 235. The third-party server 250 and service provider server 240 may each represent multiple linked computing devices. Multiple distinct third party servers, such as the third-party server 250, may be included in the network environment 200. A portion or all of the third-party server 250 may be a part of the service provider server 240.

The data store 245 may be operative to store data, such as user information, data relating to ideas, or ratings of ideas of the users 120A-N. The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The content providers 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may provide user interfaces to the content providers 110A-N via the networks 230, 235, through the web applications, standalone applications or mobile applications 210A-N. The service provider server 240 may also provide user interfaces to the users 120A-N via the networks 230, 235, through the web applications, standalone applications or mobile applications 220A-N. The user interfaces may be designed using ADOBE FLEX. The user interfaces may be initially downloaded when the applications 210A-N, 220A-N first communicate with the service provider server 240. The client applications 210A-N, 220A-N may download all of the code necessary to implement the user interfaces, but none of the actual data. The data may be downloaded from the service provider server 240 as needed.

The user interface may be developed using the singleton development pattern, utilizing the model locator found within the cairngorm framework. Within the singleton pattern there may be several data structures each with a corresponding data access object. The data structures may be structured to receive the information from the service provider server 240.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the content provider B 110B or the user B 120B. The user interface may be operatively connected to the memory, the processor, and the display and may be capable of interacting with a user B 120B or a content provider B 110B. The communication interface may be operatively connected to the memory, and the processor, and may be capable of communicating through the networks 230, 235 with the service provider server 240, and the third party server 250. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX, and PHP, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data store, such as the data store 245, a database server, and a middleware server. The application server may be a dynamic HTML server, such as using ASP, JSP, PHP, or other technologies. The service provider server 240 may co-exist on one machine or may be running in a distributed configuration on one or more machines. The service provider server 240 may collectively be referred to as the server. The service provider server 240 may implement a server side Wiki engine, such as ATLASSIAN CONFLUENCE. The service provider server 240 may receive requests from the users 120A-N and the content providers 110A-N and may provide data to the users 120A-N and the content providers 110A-N based on their requests. The service provider server 240 may communicate with the client applications 210A-N, 220A-N using extensible markup language (XML) messages.

The third party server 250 may include one or more of the following: an application server, a data source, such as a database server, and a middleware server. The third party server may implement any third party application that may be used in a collaborative innovation system, such as a user verification system. The third party server 250 may co-exist on one machine or may be running in a distributed configuration on one or more machines. The third party server 250 may receive requests from the users 120A-N and the content providers 110A-N and may provide data to the users 120A-N and the content providers 110A-N based on their requests.

Figure 15:
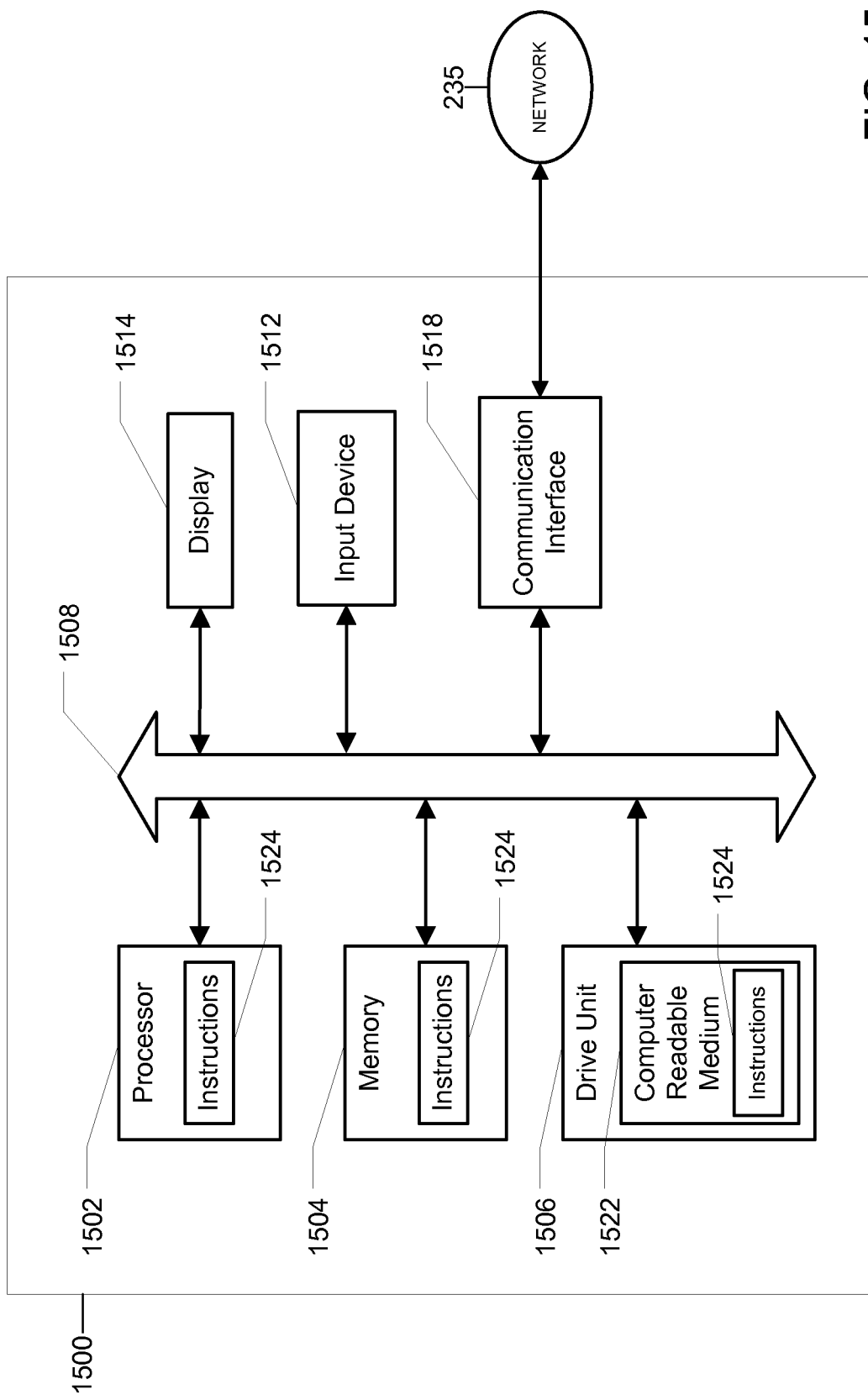
FIG. 15 is an illustration of a general computer system that may be used in the systems of FIG. 2, or other systems for providing an interface for collaborative innovation.

The service provider server 240 and the third party server 250 may be one or more computing devices of various kinds, such as the computing device in FIG. 15. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, and middleware servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols. The middleware server may be any middleware that connects software components or applications.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the client applications 210A-N, 220A-N may make requests back to the service provider server 240. The service provider server 240 may access the data store 245 and retrieve information in accordance with the request. The information may be formatted as XML and communicated to the client applications 210A-N, 220A-N. The client applications 210A-N, 220A-N may display the XML appropriately to the users 120A-N, and/or the content providers 110A-N.

Figure 3:
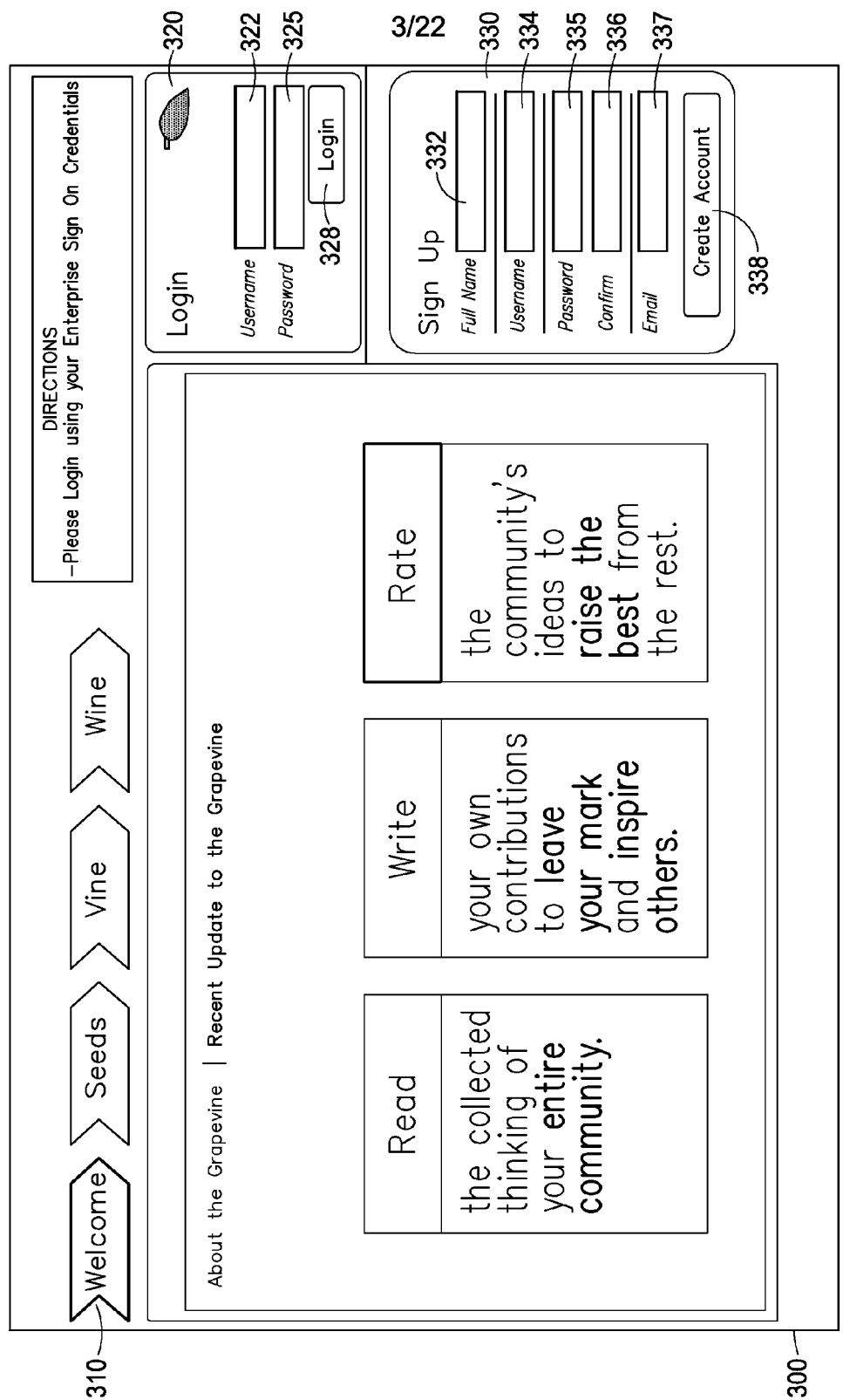
FIG. 3 is a screenshot of a user login interface in the system of FIG. 1, or other systems for providing an interface for collaborative innovation.

FIG. 3 is a screenshot of a user login interface 300 in the system of FIG. 1, or other systems for providing an interface for collaborative innovation. The system 100 may display the user login interface 300 to the user A 120A when the user A 120A first interacts with the system 100. The user A 120A may use the user login interface 300 to log into the system 100, or create a new account to access the system 100. The user login interface 300 may include a navigation bar 310, a login subsection 320, and a sign up subsection 330. The login subsection 320 may include a username field 322, a password field 325, and a login button 328. The sign up subsection 330 may include a full name field 332, a username field 334, a password field 335, a confirm password field 336, an email field 337, and a create account button 338.

In operation the user A 120A may enter their username in the username field 322 and their password in the password field 325. The user A 120A may then click on the login button 328 to login into the system 100. If the user A 120A does not already have an account the user A 120A may fill in the fields in the sign up subsection 330, and click on the create account button 338, to create a new account. The user A 120A may be granted immediate access to the system 100, or an administrator and/or one of the content providers 110A-N may need to approve of the user A 120A before the user A 120A is granted access to the system. In this instance the system 100 may notify the user A 120A when they have been granted access, such as an email notification. The navigation bar 310 displays the current screen the user A 120A is viewing. Alternatively or in addition there may be multiple user login interfaces 300. In this instance the system 100 may display a different user login interface 300 depending upon whether the user A 120A is an internal user of an organization or is a client of the organization.

Figure 3A:
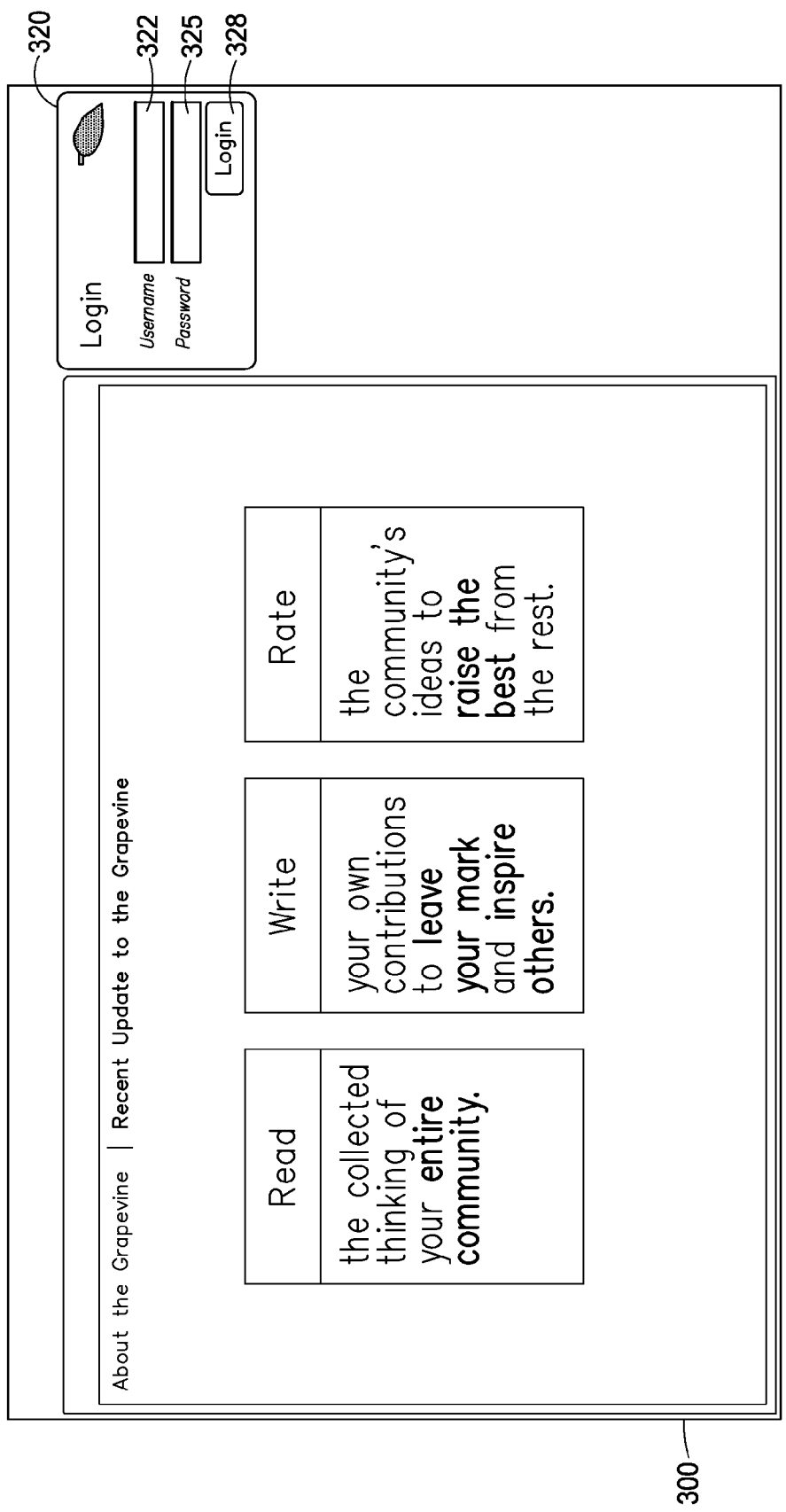
FIG. 3A is a screenshot of an alternative user login interface in the system of FIG. 1, or other systems for providing an interface for collaborative innovation.

FIG. 3A is a screenshot of an alternative user login interface 300 in the system of FIG. 1, or other systems for providing an interface for collaborative innovation. The system 100 may display the alternative user login interface 300 to the user A 120A when the user A 120A first interacts with the system 100. The user A 120A may use the alternative user login interface 300 to log into the system 100. The alternative user login interface 300 may include a login subsection 320. The login subsection 320 may include a username field 322, a password field 325, and a login button 328. In operation the user A 120A may enter their username in the username field 322 and their password in the password field 325. The user A 120A may then click on the login button 328 to login into the system 100.

Figure 4:
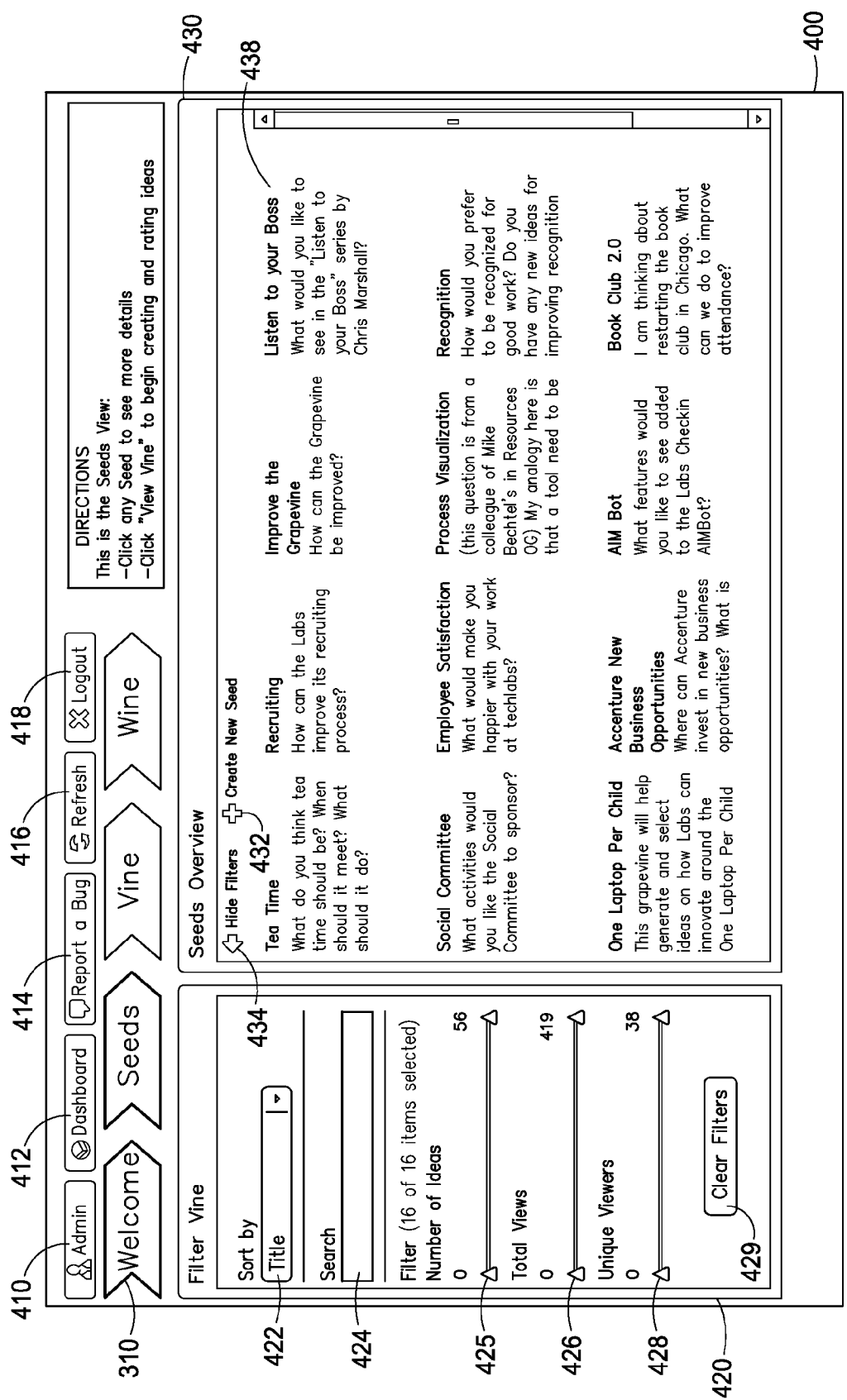
FIG. 4 is a screenshot of an initial item selection interface in the system of FIG. 1, or other systems for providing an interface for collaborative innovation.

FIG. 4 is a screenshot of an initial item selection interface 400 in the system of FIG. 1, or other systems for providing an interface for collaborative innovation. The system 100 may display the initial item selection interface 400 to the user A 120A after the user A 120A logs into the system 100. The user A 120A may use the initial item selection interface 400 to search, filter, and select one or more of the initial items. The initial item selection interface 400 may include a navigation bar 310, an admin button 410, a dashboard button 412, a report a bug button 414, a search button 416, a logout button 418, a filter subsection 420 and an initial item subsection 430. The filter subsection 420 may include a sort by selector 422, a search field 424, a number of ideas filter 425, a total views filter 426, a unique viewers filter 428 and a clear filters button 429. The initial item subsection 430 may include a create new seed button 432, a hide filters button 434, and initial items 438.

In operation, the user A 120A may click on the admin button 410 to view the admin interface. The user A 120A may need certain permissions to access the admin interface. The admin interface may be described in more detail in FIG. 9. The user A 120A may click on the dashboard button 412 to view the dashboard interface. The dashboard interface may be described in more detail in FIG. 8. The user A 120A may click on the refresh button 416 to refresh the data displayed in the initial item selection interface 400. The user A 120A may click on the logout button 418 to log out of the system 100.

The user A 120A may use the filter subsection 420 to sort and/or filter the initial items 438. The sort by selector 422 may be used to sort by one or more characteristics of the initial items 438, such as the title, creator, creation date, and number of grape ideas of the initial items 438. The search field 424 may be used to search the initial items 438. The filters 425, 426, 428, may be used to filter the seeds ideas 438. The clear filters button 429 may be used to reset the filters 425, 426, 428.

The user A 120A may view one or more initial items 438 in the initial item subsection 430. The user A 120A may hide the filter subsection 420 by clicking on the hide filters button 434. The user A 120A may create a new initial item by clicking on the create new seed button 432. The user A 120A may be required to have certain permissions in order to create a new initial item. The user A 120A may click on one of the initial items 438 to view detailed information about the initial item. The detailed information screen may be discussed in more detail in FIG. 5.

Alternatively or in addition the initial item selection interface 400 may allow a user A 120A to flag an initial item for potential removal by an administrator. The administrator may review the initial item and determine whether to remove the initial item. There may be two types of seed creation modes, a crowd controlled mode, where any of the users 120A-N can create an initial item, and a managed mode, where only administrator users can create an initial item.

Figure 4A:
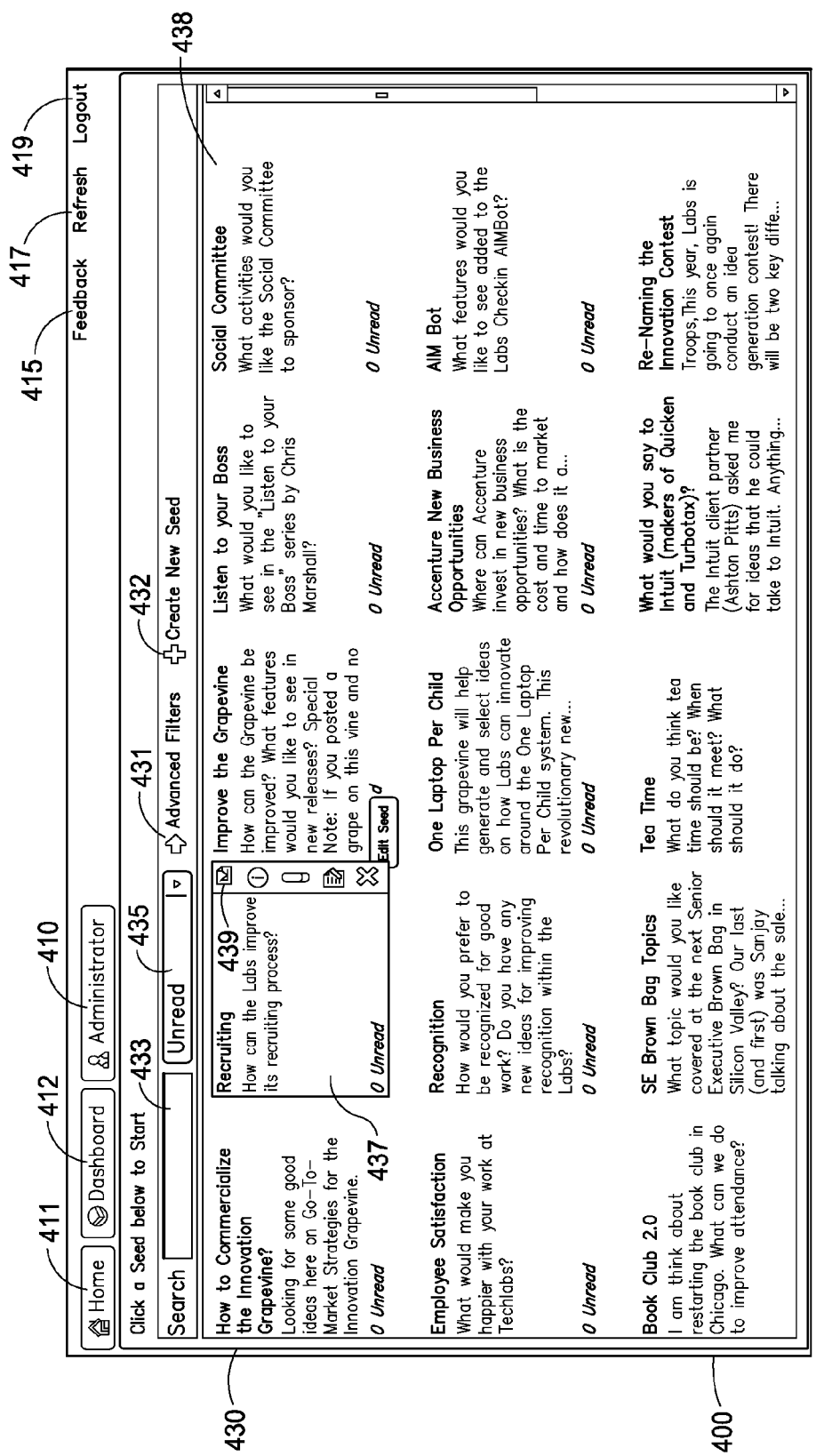
FIG. 4A is a screenshot of an alternative initial item selection interface in the system of FIG. 1, or other systems for providing an interface for collaborative innovation.

FIG. 4A is a screenshot of an alternative initial item selection interface 400 in the system of FIG. 1, or other systems for providing an interface for collaborative innovation. The system 100 may display the alternative initial item selection interface 400 to the user A 120A after the user A 120A logs into the system 100. The user A 120A may use the alternative initial item selection interface 400 to search, filter, and select one or more of the initial items. The initial item selection interface 400 may include an admin button 410, a dashboard button 412, a home button 411, a feedback link 415, a refresh link 417, a logout link 419, and an initial item subsection 430. The initial item subsection 430 may include an advanced filters button 431, a create new seed button 432, a search field 433, a search dropdown box 435, a selected initial item 437, an initial item action buttons 439, and initial items 438.

In operation, the user A 120A may click on the admin button 410 to view the admin interface. The user A 120A may need certain permissions to access the admin interface. The admin interface may be described in more detail in FIG. 9. The user A 120A may click on the dashboard button 412 to view the dashboard interface. The dashboard interface may be described in more detail in FIG. 8. The user A 120A may click on the refresh link 417 to refresh the data displayed in the initial item selection interface 400. The user A 120A may click on the logout button 418 to log out of the system 100. The user A 120A may click on the feedback link 415 to provide feedback on the system 100, such as to an administrator. The home button 411 may return the user to the user login interface 300. Alternatively or in addition the user A 120A may specify any screen or interface in the system 100 as a home screen. When the user A 120A clicks on the home button 411 the user A 120A may be displayed the specified home screen.

The user A 120A may view one or more initial items 438 in the initial item subsection 430. The user A 120A may view advanced filters, such as the filters in the filter subsection 420, by clicking on the advanced filters button 431. The user A 120A may create a new initial item by clicking on the create new seed button 432. The user A 120A may be required to have certain permissions in order to create a new initial item. The user A 120A may click on one of the initial items 438 to select an initial item and/or view detailed information about the initial item. The detailed information screen may be discussed in more detail in FIG. 5.

The selected item 437 may be an item selected by the user A 120A. When the user A 120A selects an item the user A 120A may use the selected item action buttons 439 to perform actions on the selected item 437. The actions may include emailing the item, receiving additional information on the item, attaching an item, such as a file, to the item, editing the item and deleting the item. If the user A 120A selects to edit the selected item 437 the user A 120A may be taken to the detailed information screen of FIG. 5.

The user A 120A may use the search field 433 to search for initial items. The user A 120A may use the search dropdown box 435 to filter the items searched, such as by only searching the unread items.

Figure 5:
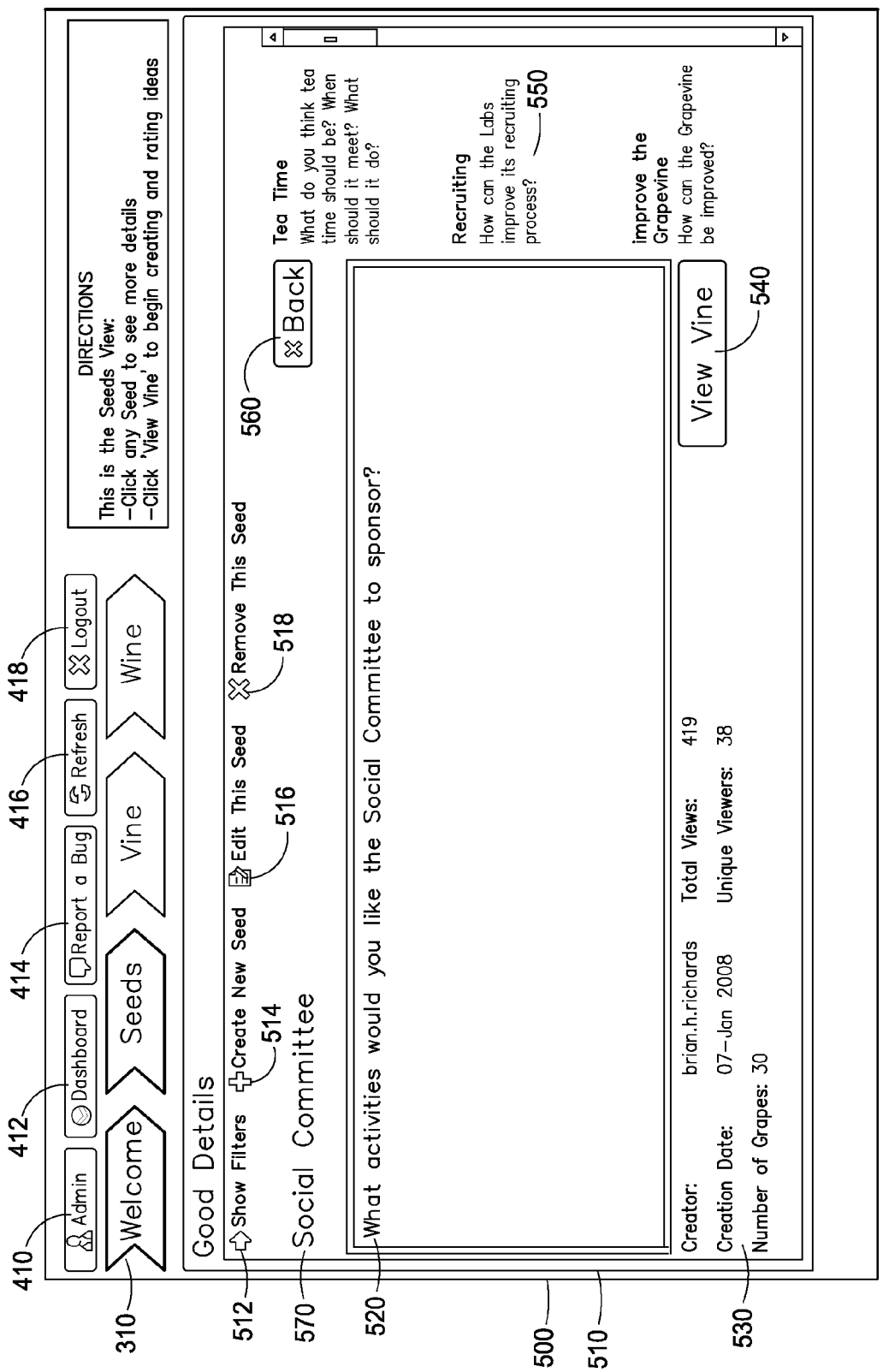
FIG. 5 is a screenshot of an initial item details screen in the system of FIG. 1, or other systems for providing an interface for collaborative innovation.

FIG. 5 is a screenshot of an initial item details screen 500 in the system of FIG. 1, or other systems for providing an interface for collaborative innovation. The system 100 may display the initial items details screen 500 to the user A 120A when the user A 120A clicks on one of the initial items 438 in the initial item subsection 430 of the initial item selection interface 400 in FIG. 4. The user A 120A may use the initial item details screen 500 to view detailed information regarding the selected initial item. The initial item details screen 500 may include a navigation bar 310, an admin button 410, a dashboard button 412, a report a bug button 414, a refresh button 416, a logout button 418, a seed details subsection 510, an initial item 520, a seed information subsection 530, a view vine button 540, an additional initial items subsection 550, a back button 560, and a seed title 570. The seed details subsection 510 may include a show filters button 512, a create new seed button 514, an edit this seed button 516, and a remove this seed button 518.

In operation the user A 120A may view detailed information about the initial item in the initial item information subsection 530. The detailed information may include the creator of the initial item, the creation date of the initial item, the number of grape ideas innovated from the initial item, the total number of views of the initial item and the number of unique viewers of the initial item. The user A 120A may use the show filters button 512 to view the current filter settings. The user A 120A may use the create new seed button 514 to create a new initial item. The initial item may be edited with the edit this seed button 516 and removed with the remove this seed button 518. The system 100 may require that the user A 120A have the appropriate permissions in order to add, edit, or delete an initial item. The user A 120A may view the details of another initial item by clicking on an initial item in the additional initial items subsection 550. The user A 120A may click on the back button 560 to return to the initial item selection interface 400 as discussed in FIG. 4. The user A 120A may click on the view vine button 540 to view the ideas innovated from the initial item in the initial item collaborative innovation screen 600 discussed in more detail in FIG. 6.

Figure 6:
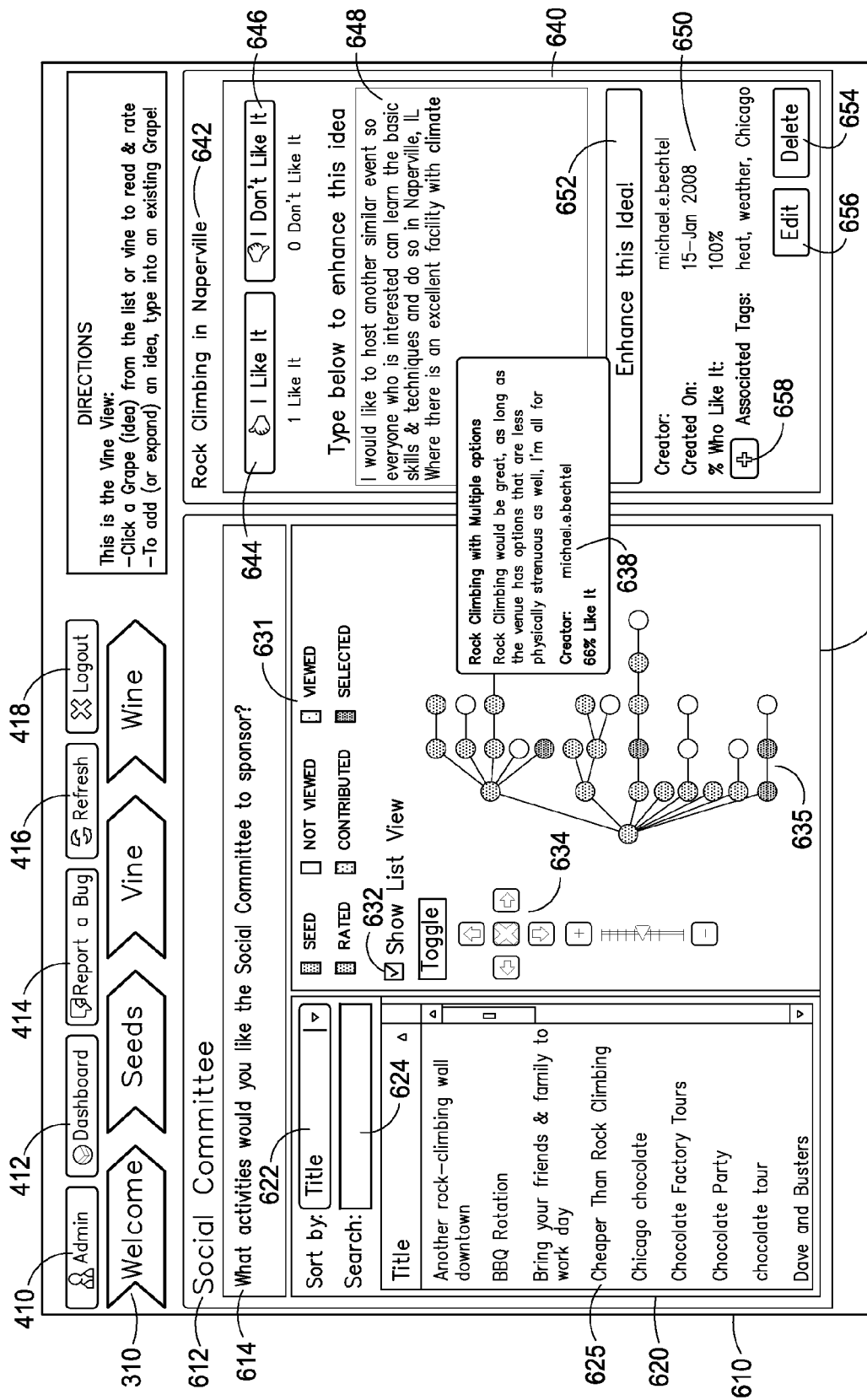
FIG. 6 is a screenshot of an initial item collaborative innovation screen in the system of FIG. 1, or other systems for providing an interface for collaborative innovation.

FIG. 6 is a screenshot of an initial item collaborative innovation screen 600 in the system of FIG. 1, or other systems for providing an interface for collaborative innovation. The system 100 may display the initial item collaborative innovation screen 600 to the user A 120A when the user A 120A clicks on the view vine button 540 in the initial item details screen 500, as discussed in FIG. 5. The user A 120A may use the initial item collaborative innovation screen 600 to view, add, and rate ideas that have been innovated from the initial item. The initial item collaborative innovation screen 600 may display a graphical depiction of the ideas in the form a tree. In the system 100, the graphical tree-like depiction may be referred to as a graphical hierarchical representation of the ideas. The initial item collaborative innovation screen 600 may include a navigation bar 310, an admin button 410, a dashboard button 412, a report a bug button 414, a refresh button 416, a logout button 418, an idea display section 610 and an idea modification section 640. The idea display section 610 may include an idea title 612, an initial item 614, an idea selector subsection 620 and a collaborative display subsection 630. The idea selector subsection 620 may include a sort by selector 622, a search field 624, and an idea list 625. The collaborative display subsection 630 may include a legend display 631, a show list view checkbox 632, a display modifier 634, a graphical collaborative display 635, and an idea detail display 638. The idea modification section 640 may include a selected idea title 642, a like button 644, a don't like button 646, an idea enhancement field 648, an enhance button 652, an idea information display 650, an add tag button 658, an edit button 656, and a delete button 654.

In operation the user A 120A may view a graphical display of the collaborative innovation for a selected initial item, also known as the graphical hierarchical representation of the ideas, in the graphical collaborative display 635. The graphical collaborative display 635 may display a visual representation of the collaborative innovation process. The user A 120A may modify the data that is displayed in the graphical collaborative display 635 by using the idea selector subsection 620. The user may view ideas in the idea list 625 and may change the ideas displayed in the idea list by using the sort by selector 622 and the search field 624.

The user A 120A may scroll and zoom in and zoom out of the graphical collaborative display 635 using the display modifier 634. The graphical collaborative display 635 may include one or more nodes representing ideas. The user A 120A may click on one of the nodes to view detailed information regarding the idea in the idea detail display 638. Alternatively or in addition the information in the idea detail display 638 may be automatically displayed when the user A 120A uses a pointing interface, such as a mouse, to hover over a node in the graphical collaborative display 635. The user A 120A may be able to easily move around the graphical collaborative display 635 at any zoom level. The user A 120A may zoom in and zoom out using the + and − buttons, or by using a mouse wheel. The legend display 631 may color code the ideas based on whether the user A 120A has contributed, viewed, selected, or rated the idea.

The user A 120A may use the idea modification section 640 to modify or enhance a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may edit the idea by clicking on the edit button 656 and may delete the selected idea by clicking on the delete button 654.

Figure 6A:
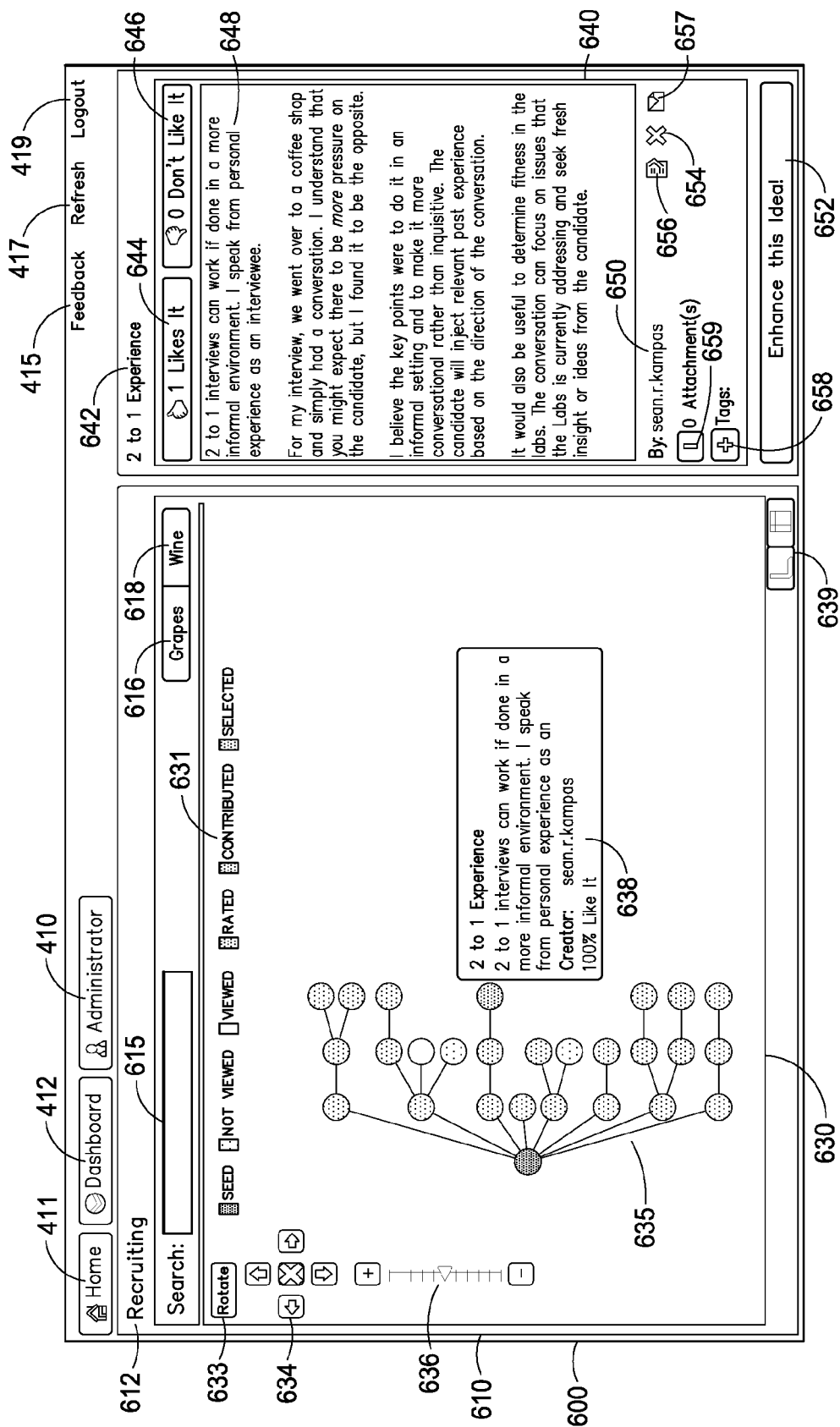
FIG. 6A is a screenshot of an alternative initial item collaborative innovation screen in the system of FIG. 1, or other systems for providing an interface for collaborative innovation.

FIG. 6A is a screenshot of an alternative initial item collaborative innovation screen 600 in the system of FIG. 1, or other systems for providing an interface for collaborative innovation. The system 100 may display the alternative initial item collaborative innovation screen 600 to the user A 120A when the user A 120A clicks on the view vine button 540 in the initial item details screen 500, as discussed in FIG. 5. The user A 120A may use the alternative initial item collaborative innovation screen 600 to view, add, and rate ideas that have been innovated from the initial item. The alternative initial item collaborative innovation screen 600 may display a graphical hierarchical representation of the ideas in the form a tree-like structure. In the system 100, the graphical tree-like structure may be referred to as a graphical hierarchical representation of the ideas. The alternative initial item collaborative innovation screen 600 may include an admin button 410, a home button 411, a dashboard button 412, a feedback link 415, a refresh link 417, a logout link 419, an idea display section 610 and an idea modification section 640. The idea display section 610 may include an idea title 612, a search field 615, a grapes button 616, a wine button 618, and a collaborative display subsection 630. The collaborative display subsection 630 may include a legend display 631, a display modifier 634, a rotate button 633, a zoom bar 636, a graphical collaborative display 635, an idea detail display 638, and a list/graph toggle button 639. The idea modification section 640 may include a selected idea title 642, a like button 644, a don't like button 646, an idea enhancement field 648, an enhance button 652, an idea information display 650, an add tag button 658, an edit button 656, an add attachment button 659, an email button 657, and a delete button 654.

Figure 6B:
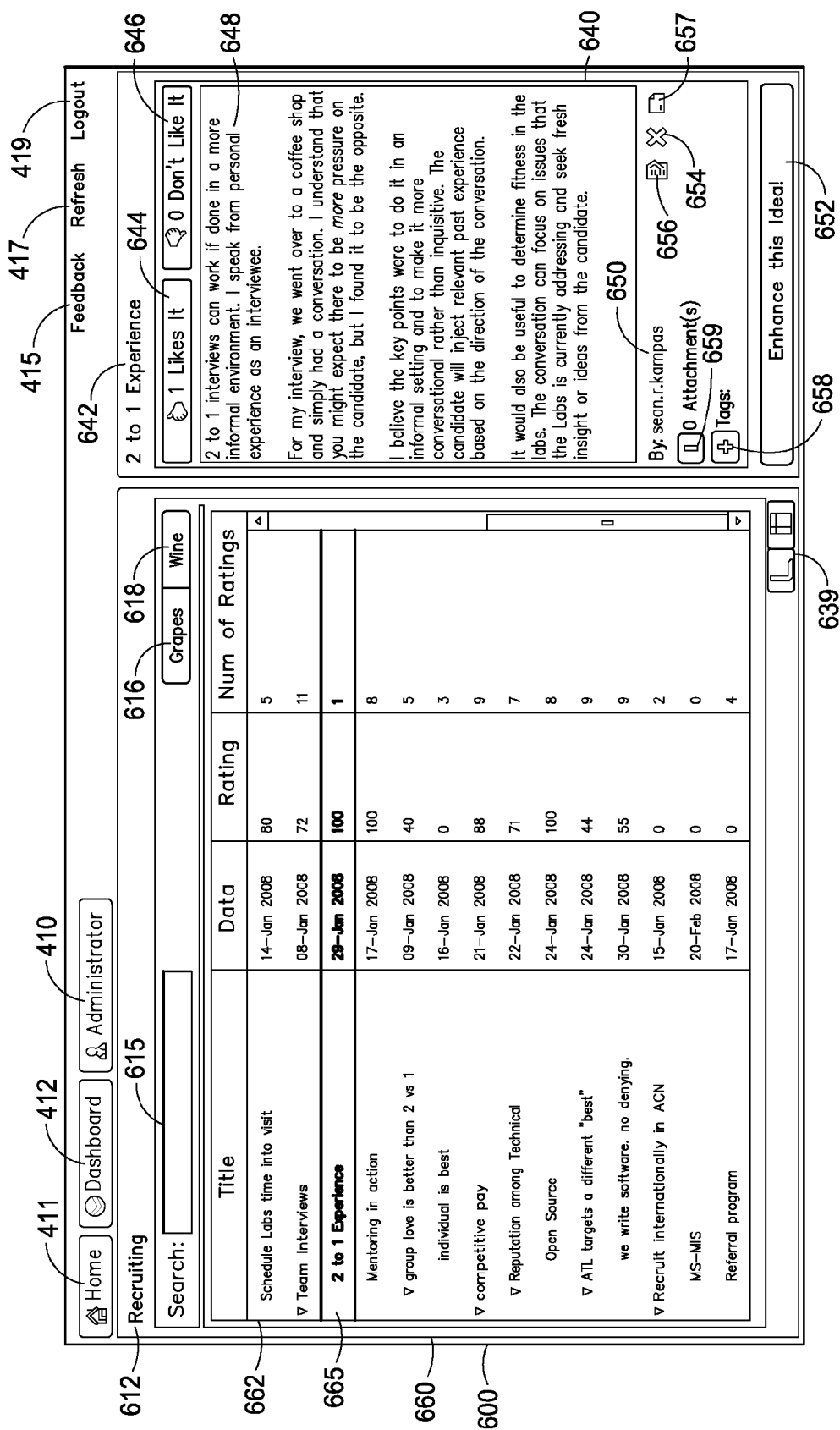
FIG. 6B is a screenshot of a list view in an alternative initial item collaborative innovation screen in the system of FIG. 1, or other systems for providing an interface for collaborative innovation.

In operation the user A 120A may view a graphical display of the collaborative innovation for a selected initial item, also known as the graphical hierarchical representation of the ideas, in the graphical collaborative display 635. The graphical collaborative display 635 may display a visual representation of the collaborative innovation process. The user A 120A may toggle between the list view display and the graph view display using the list/graph toggle button 639. FIG. 6B discusses the list view in more detail.

The user A 120A may move around the graphical collaborative display 635 using the display modifier 634. The user A 120A may zoom in and out of the graphical collaborative display using the zoom bar 636. The user A 120A may rotate the graphical collaborative display 635 using the rotate button 633. The graphical collaborative display 635 may include one or more nodes representing ideas. The user A 120A may click on one of the nodes to view detailed information regarding the idea in the idea detail display 638. Alternatively or in addition the information in the idea detail display 638 may be automatically displayed when the user A 120A uses a pointing interface, such as a mouse, to hover over a node in the graphical collaborative display 635. The legend display 631 may color code the ideas based on whether the user A 120A has contributed, viewed, selected, or rated the idea.

The user A 120A may use the idea modification section 640 to modify, enhance, or rate a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may add an attachment to the idea by clicking on the attachment button 659. The user A 120A may email the selected idea by clicking on the email button 657. The user A 120A may edit the idea by clicking on the edit button 656 and may delete the selected idea by clicking on the delete button 654.

The user A 120A may search through the ideas by using the search field 615. The user A 120A may toggle whether the only the best ideas are searched or whether all the ideas are searched by using the grapes button 616 and the wine button 618. If the user A 120A clicks on the wine button 618 the search may be limited to the best ideas. If the user A 120A clicks on the grapes button 616, the search may be expanded to all the ideas. FIG. 6 may use the term "grape" to refer to all of the ideas stemming from the initial ideas, and may use the word "wine" to refer to the best ideas stemming from the initial idea.

FIG. 6B is a screenshot of a list view in an alternative initial item collaborative innovation screen 600 in the system of FIG. 1, or other systems for providing an interface for collaborative innovation. The system 100 may display the alternative initial item collaborative innovation screen 600 to the user A 120A when the user A 120A clicks on the view vine button 540 in the initial item details screen 500, as discussed in FIG. 5. Alternatively or in addition the user A 120A may click on the list/graph toggle button 639 in FIG. 6A, to be displayed the list view in the alternative initial item collaborative innovation screen 600. The user A 120A may use the alternative initial item collaborative innovation screen 600 to view, add, and rate ideas that have been innovated from the initial item. The alternative initial item collaborative innovation screen 600 may display a graphical hierarchical representation of the ideas in the form a tree-like structure. In the system 100, the graphical tree-like structure may be referred to as a graphical hierarchical representation of the ideas. The alternative initial item collaborative innovation screen 600 may include an admin button 410, a home button 411, a dashboard button 412, a feedback link 415, a refresh link 417, a logout link 419, an idea display section 610 and an idea modification section 640. The idea display section 610 may include an idea title 612, a search field 615, a grapes button 616, a wine button 618, and a collaborative list subsection 660. The collaborative list subsection 660 may include an ideas table 662 and a selected idea 665. The idea modification section 640 may include a selected idea title 642, a like button 644, a don't like button 646, an idea enhancement field 648, an enhance button 652, an idea information display 650, an add tag button 658, an edit button 656, an add attachment button 659, an email button 657, and a delete button 654.

In operation the user A 120A may view a list of the ideas in the ideas table 662. The selected idea 665 may represent an idea the user A 120A selected from the ideas table. The selected idea 665 may be enhanced or rated in the idea modification subsection 640. The user A 120A may toggle to the graph view display by using the list/graph toggle button 639. FIG. 6A discusses the graph view in more detail. The ideas table 662 may display the ideas in a thread view. The thread view may first display an initial idea with the enhancements to the initial idea listed below the initial idea. Enhancements to the enhancements may be similarly situated below the idea and/or enhancement they were derived from.

The user A 120A may use the idea modification section 640 to modify, enhance, or rate a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may add an attachment to the idea by clicking on the attachment button 659. The user A 120A may email the selected idea by clicking on the email button 657. The user A 120A may edit the idea by clicking on the edit button 656 and may delete the selected idea by clicking on the delete button 654.

The user A 120A may search through the ideas by using the search field 615. The user A 120A may toggle whether the only the best ideas are searched or whether all the ideas are searched by using the grapes button 616 and the wine button 618. If the user A 120A clicks on the wine button 618 the search may be limited to the best ideas. If the user A 120A clicks on the grapes button 616, the search may be expanded to all the ideas. FIG. 6 may use the term "grape" to refer to all of the ideas stemming from the initial ideas, and may use the word "wine" to refer to the best ideas stemming from the initial idea.

Figure 7:
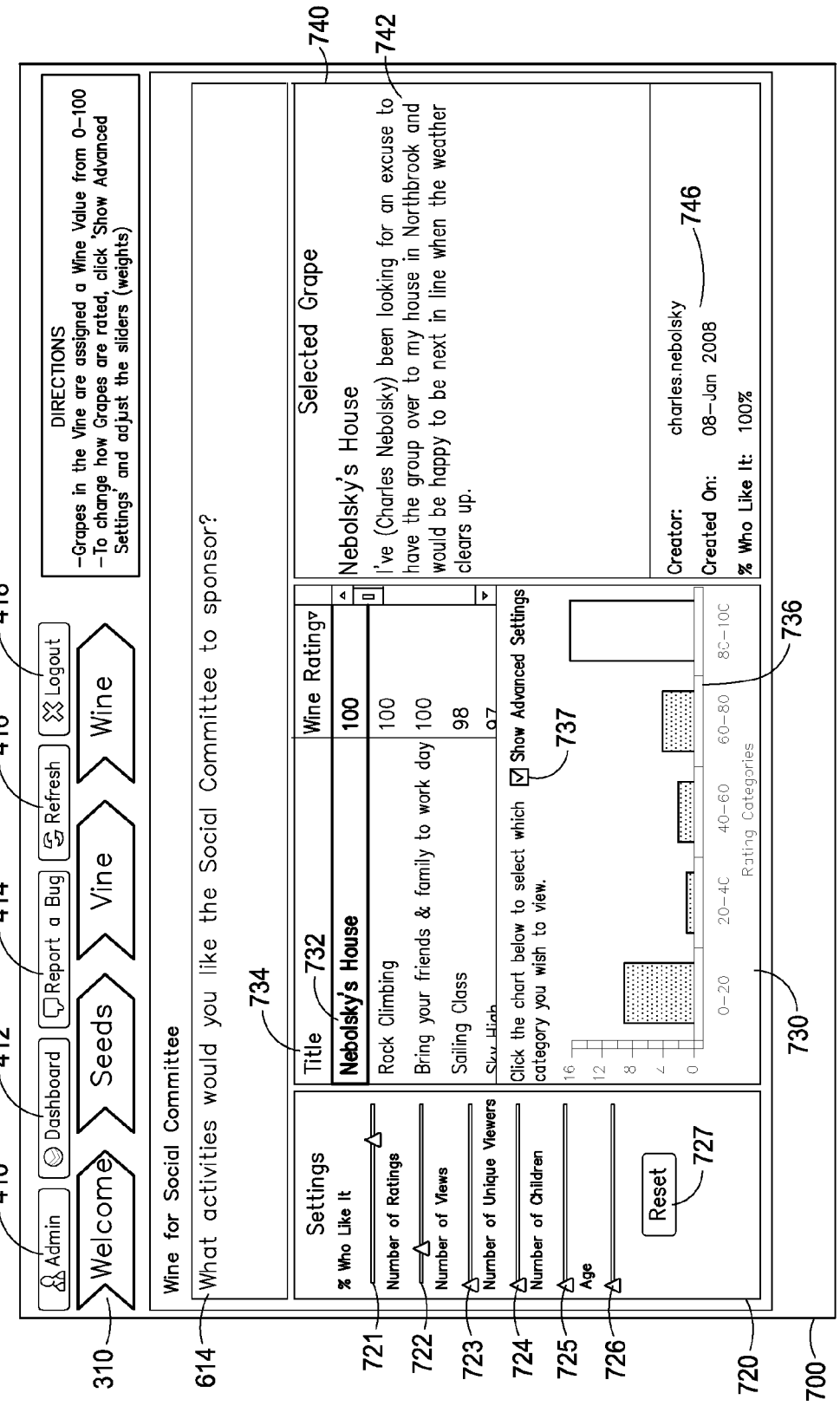
FIG. 7 is a screenshot of an initial item results screen in the system of FIG. 1, or other systems for providing an interface for collaborative innovation.

FIG. 7 is a screenshot of an initial item results screen 700 in the system of FIG. 1, or other systems for providing an interface for collaborative innovation. The system 100 may display the initial item results screen 700 to one of the content providers 110A-N, such as the content provider A 110A. The initial item results screen 700 may display a summary of the ideas that were innovated from the initial item. The ideas stemming from the initial item may be sorted based on the ratings received from the users 120A-N. The initial item results screen 700 may include a navigation bar 310, an admin button 410, a dashboard button 412, a report a bug button 414, a refresh button 416, a logout button 418, an initial item 614, a settings subsection 720, a summary subsection 730, and a selected idea subsection 740. The settings subsection 720 may include a like it selector 721, a number of ratings selector 722, a number of views selector 723, a number of unique viewers selector 724, a number of children selector 725, an age selector 726 and a reset button 727. The summary subsection 730 may include a rating category graph 736, an idea list 734, an advanced settings checkbox 737, and a selected idea 732. The selected idea subsection 740 may include a selected idea description display 742 and a selected idea details display 746.

The settings subsection 720 may be used to modify the weight given to each factor in the overall rating calculation. The selectors 721, 722, 723, 724, 725, 726 may be adjusted to change the weight afforded to each factor in the overall ratings calculations. The selectors 721, 722, 723, 724, 725, 726 may be reset by clicking on the reset button 727. The summary subsection 730 may display the ideas most highly rated by the users 120A-N in accordance with the weight of the factors indicated in the settings subsection 720. The user A 120A may use the advanced settings checkbox 737 to toggle the display of the settings subsection 720. The ratings category graph 736 may display ranges of the ratings for the selected initial item. The user A 120A may click on a bar in the ratings category graph 736 to change the range of ratings of the ideas displayed in the idea list 734.

The user A 120A may select an idea from the idea list 734 and view detailed information regarding the selected idea in the selected idea subsection 740. The user A 120A may view the description of the selected idea 732 in the selected idea description display 742. The user A 120A may view the details associated with the selected idea in the selected idea description display 746.

Figure 7A:
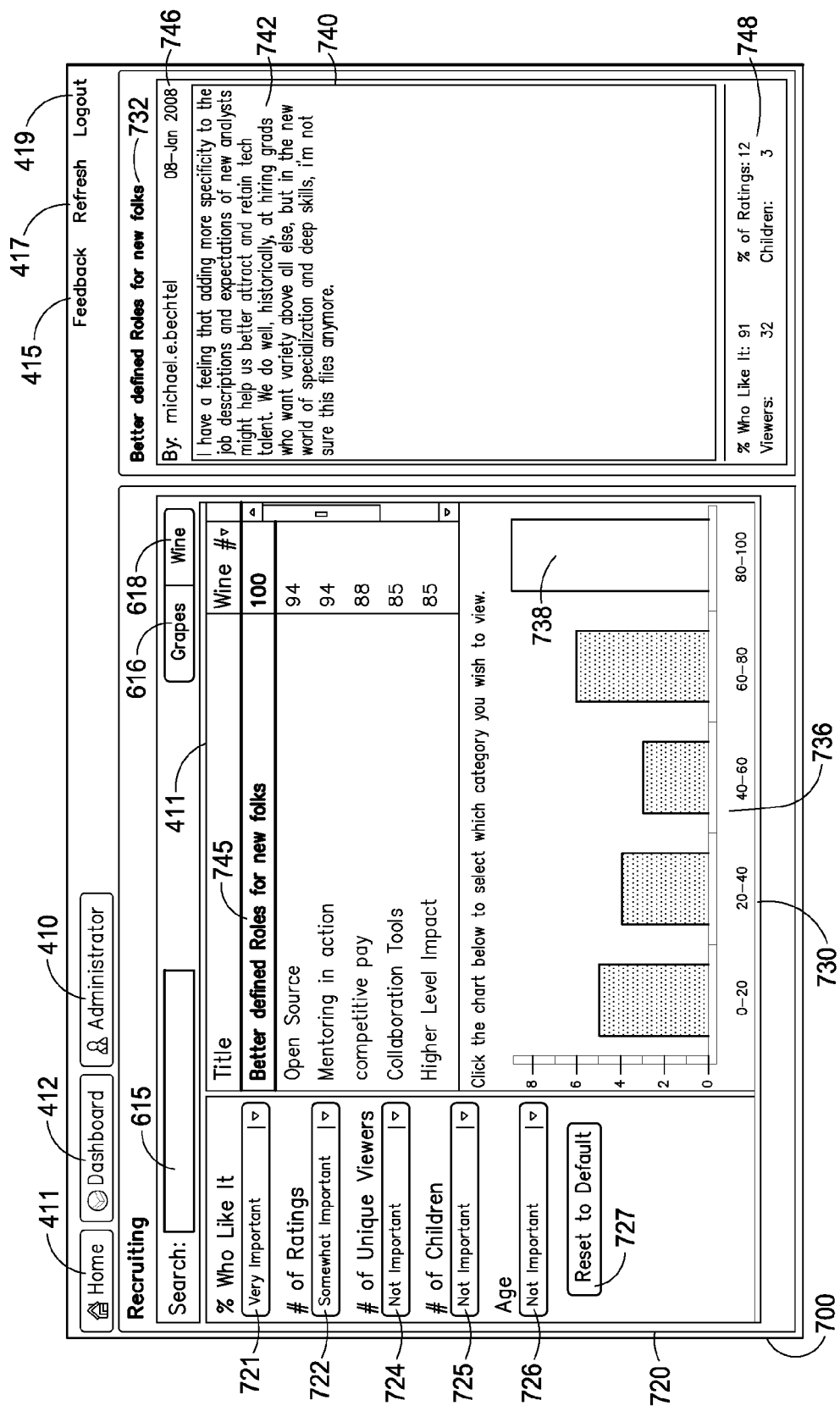
FIG. 7A is a screenshot of an alternative initial item results screen in the system of FIG. 1, or other systems for providing an interface for collaborative innovation.

FIG. 7A is a screenshot of an alternative initial item results screen 700 in the system of FIG. 1, or other systems for providing an interface for collaborative innovation. The system 100 may display the alternative initial item results screen 700 to one of the content providers 110A-N, such as the content provider A 110A. The alternative initial item results screen 700 may display a summary of the ideas that were innovated from the initial item. The ideas stemming from the initial item may be sorted based on the ratings received from the users 120A-N. The initial item results screen 700 may include an admin button 410, a home button 411, a dashboard button 412, a feedback link 415, a refresh link 417, a logout link 419, a search field 615, a grapes button 616, a wine button 618, a settings subsection 720, a summary subsection 730, and a selected idea subsection 740. The settings subsection 720 may include a like it selector 721, a number of ratings selector 722, a number of unique viewers selector 724, a number of children selector 725, an age selector 726 and a reset button 727. The summary subsection 730 may include a rating category graph 736, an idea list 734, a selected rating bar 738, and a selected idea 732. The selected idea subsection 740 may include a selected idea 732, a selected idea description display 742, a selected idea details display 746, and a selected idea ratings display 748.

The settings subsection 720 may be used to modify the weight given to each factor in the overall rating calculation. The selectors 721, 722, 724, 725, 726 may be adjusted to change the weight afforded to each factor in the overall ratings calculations. The selectors 721, 722, 724, 725, 726 may be reset by clicking on the reset button 727. The summary subsection 730 may display the ideas most highly rated by the users 120A-N in accordance with the weight of the factors indicated in the settings subsection 720. The ratings category graph 736 may display ranges of the ratings for the selected initial item. The selected rating bar 738 in the ratings category graph 736 may be a bar selected by the user A 120A. The selected rating bar 738 in the ratings category graph 736 to change the range of ratings of the ideas displayed in the idea list 734.

The user A 120A may select an idea from the idea list 734 and view detailed information regarding the selected idea 732 in the selected idea subsection 740. The user A 120A may view the description of the selected idea 732 in the selected idea description display 742. The user A 120A may view the details associated with the selected idea 732, such as creation details, in the selected idea description display 746. The user A 120A may view ratings information of the selected idea 732 in the selected idea ratings display 748.

Figure 8:
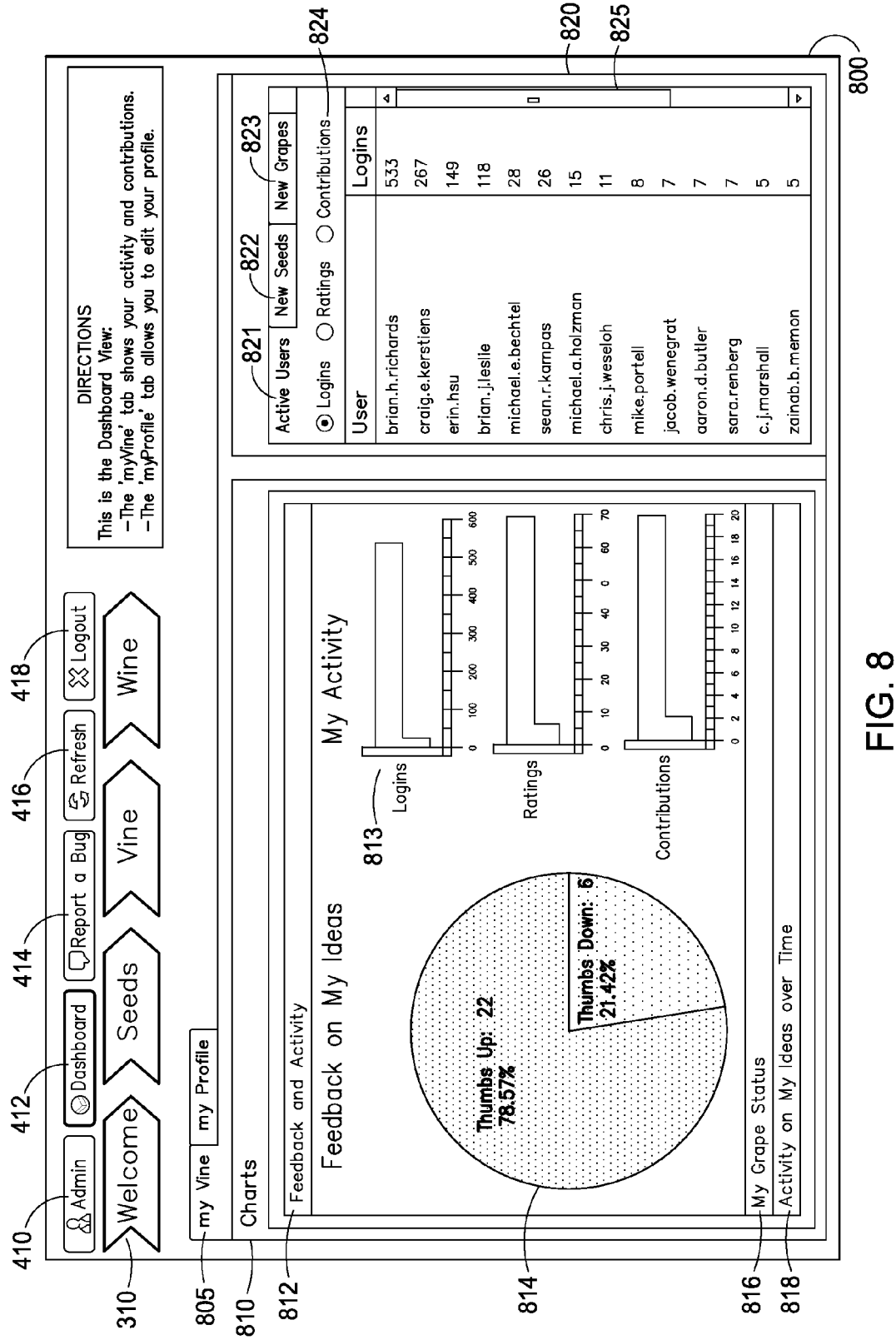
FIG. 8 is a screenshot of a user dashboard screen displaying the my vine tab in the system of FIG. 1, or other systems for providing an interface for collaborative innovation.

FIG. 8 is a screenshot of a user dashboard screen 800 in the system of FIG. 1, or other systems for providing an interface for collaborative innovation. The system 100 may display the user dashboard screen 800 to the user A 120A when the user A 120A clicks on the dashboard button 412. The user A 120A may use the user dashboard screen 800 to obtain a quick overview of recent changes that have occurred in the system 100. The user A 120A may also use the user dashboard screen 800 to view metrics regarding their use of the system 100 and the other users 120B-N use of the system 100. The user dashboard screen 800 may include a navigation bar 310, an admin button 410, a dashboard button 412, a report a bug button 414, a refresh button 416, a logout button 418, a vine tab 805, a charts subsection 810 and a user subsection 820. The charts subsection 810 may include a feedback and activity header 812, a grape status header 816, an activity header 818, a feedback graph 814, and an activity display 813. The user subsection 820 may include an active users tab 821, a new initial items tab 822, a new grape ideas tab 823, a display selector 824 and a user list 825.

In operation the user A 120A may view their activity in the charts subsection 810. The feedback graph 814 may display the number of ideas liked by the user A 120A and the number of ideas disliked by the user A 120A. The activity display 813 may display the activity of the user A 120A in the system 100. The activity display 813 may display the logins, ratings and contributions of the user A 120A. the user subsection 820 may display the activity of the other users 120B-N. The activity display 820 may display the logins, ratings and contributions of the other users 120B-N. The user A 120A may click on the new initial items tab 822 to view the new initial item activity or the user A 120A may click on the new grape ideas tab 823 to view the new grape idea activity.

The user A 120A may click on the grape status header 816 to view data associated with the status of their ideas. The user A 120A may click on the activity header 818 to view the activity on their ideas over a period of time. The user A 120A may click on the myProfile tab in the vine tab 805 to view the data associated with their user profile.

Figure 8A:
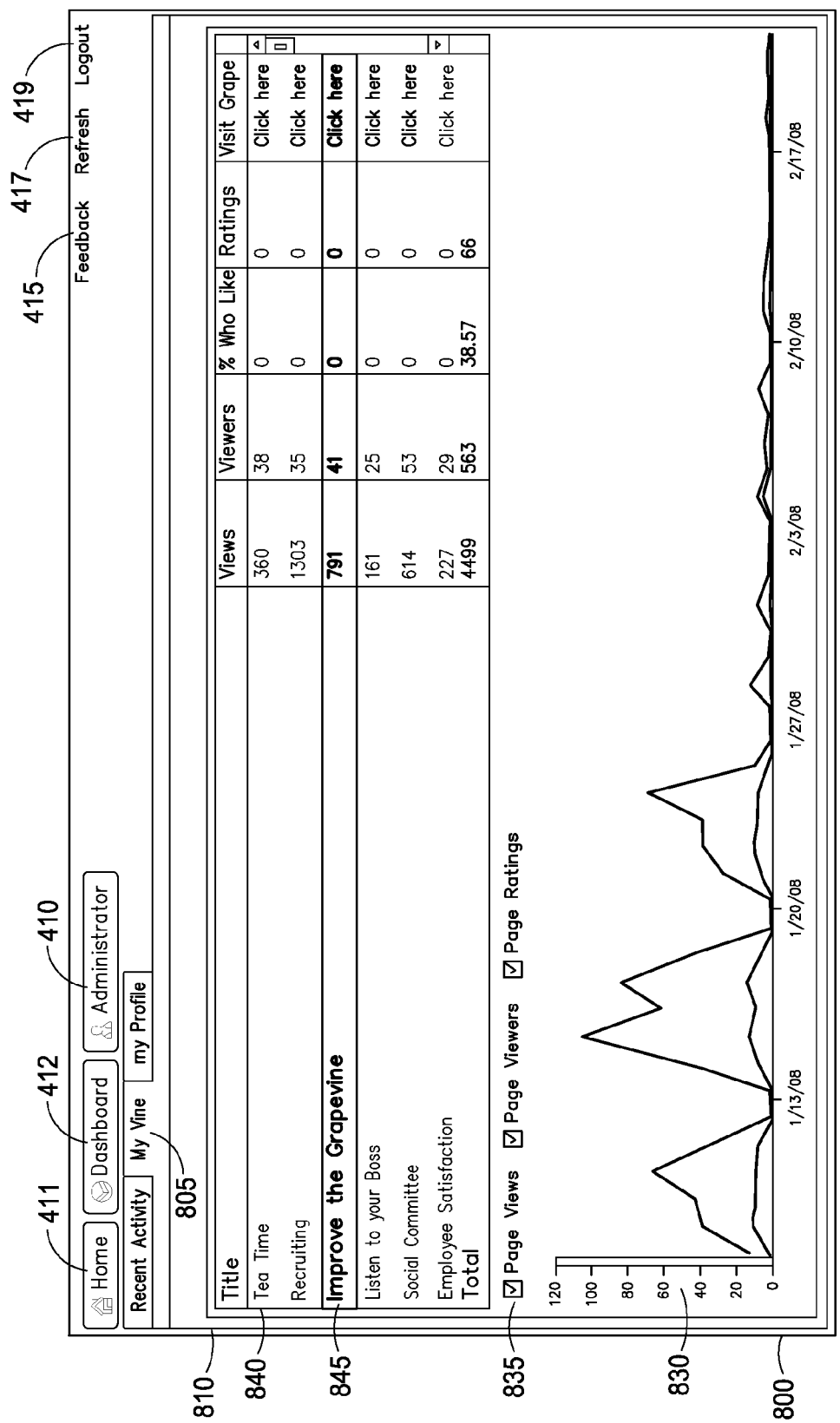
FIG. 8A is a screenshot of an alternative user dashboard screen displaying the my vine tab in the system of FIG. 1, or other systems for providing an interface for collaborative innovation.

FIG. 8A is a screenshot of an alternative user dashboard screen 800 displaying the my vine tab in the system of FIG. 1, or other systems for providing an interface for collaborative innovation. The system 100 may display the alternative user dashboard screen 800 to the user A 120A when the user A 120A clicks on the dashboard button 412. The user A 120A may use the alternative user dashboard screen 800 to obtain a quick overview of recent changes that have occurred in the system 100. The user A 120A may also use the alternative user dashboard screen 800 to view metrics regarding their use of the system 100 and the other users 120B-N use of the system 100. The alternative user dashboard screen 800 may include an admin button 410, a home button 411, a dashboard button 412, feedback link 415, a refresh link 417, a logout link 419, a vine tab 805, and charts subsection 810. The charts subsection 810 may include an initial item table 840, a selected initial item 845, a view graph 830 and view filters 835.

In operation the user A 120A may view their activity in the charts subsection 810. The initial item table 840 may display all of the initial items in the system 100 the user A 120A has provided responses or ratings for. Alternatively or in addition the initial item table 840 may display all of the initial items in the system 100. Alternatively or in addition the initial item table 840 may display all of the ideas in the system 100. The selected initial item 845 may be an initial item the user A 120A would like to view additional information for. The view graph 830, may display detailed information regarding the selected initial item 845. The user A 120A may user the view filters 835 to select on or more metrics of view for the selected item 845. For example, the user A 120A may view a graph of the page views for the selected item 845, the page viewers for the selected item 845, and/or the page ratings for the selected item 845. The user A 120A may click on the "click here" field in the "Visit Grape" column to view the associated initial item or idea.

Figure 9:
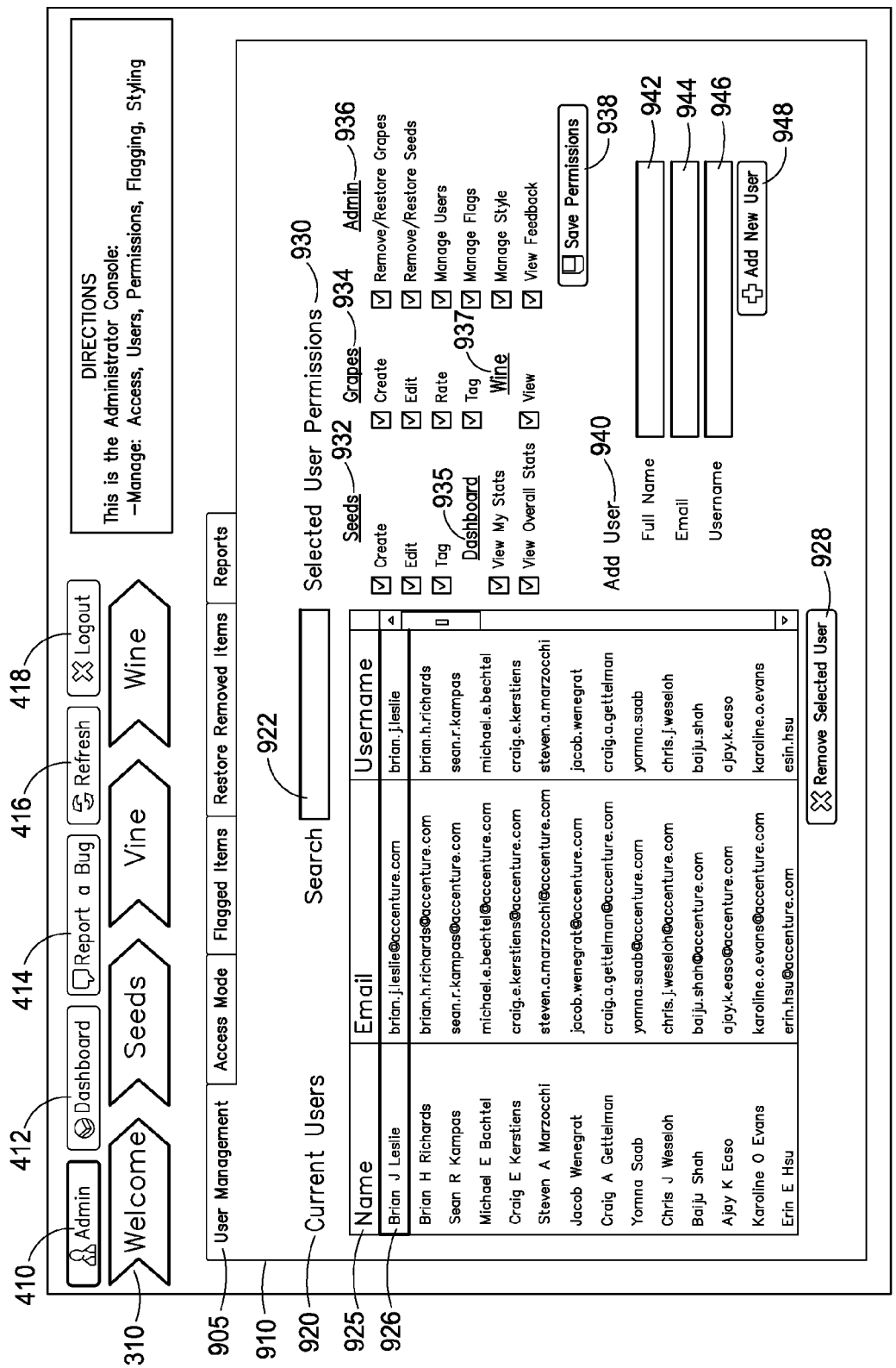
FIG. 9 is a screenshot of an administrator interface in the system of FIG. 1, or other systems for providing an interface for collaborative innovation.

FIG. 9 is a screenshot of an administrator interface 900 in the system of FIG. 1, or other systems for providing an interface for collaborative innovation. The system 100 may display the administrator interface 900 to the user A 120A when the user A 120A clicks on the admin button 410. The user A 120A may use the administrator interface 900 to view and modify the administrative data associated with the system 100. A user A 120A with administrator privileges may be taken directly to the administrator interface 900 upon logging into the system 100. The administrator interface 900 may include a navigation bar 310, an admin button 410, a dashboard button 412, a report a bug button 414, a refresh button 416, a logout button 418, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape ideas permissions 934, admin ideas permissions 936, and a save permissions button 938. The add user subsection 940 may include a full name field 942, an email field 944, a username field 946, and a add new user button 948. The administrator interface may be designed using ADOBE FLEX ACCORDION. Each accordion may contain controls similar in nature.

In operation one of the users 120A-N with administrator privileges, such as the user A 120A, may user the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape idea permissions 934, the dashboard permissions 935, the admin permissions 936, and the wine permissions 937. The initial item permissions 932 may include create, edit, and tag permissions. The grape idea permissions 934 may include create, edit, rate, and tag permissions. The admin permissions 936 may include remove/restore grape ideas, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may enter the name of the new user in the name field 942, the email of the new user in the email field 944 and the username of the new user in the username field 946. The user A 120A may add the new user by clicking on the add new user button 948.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9A:
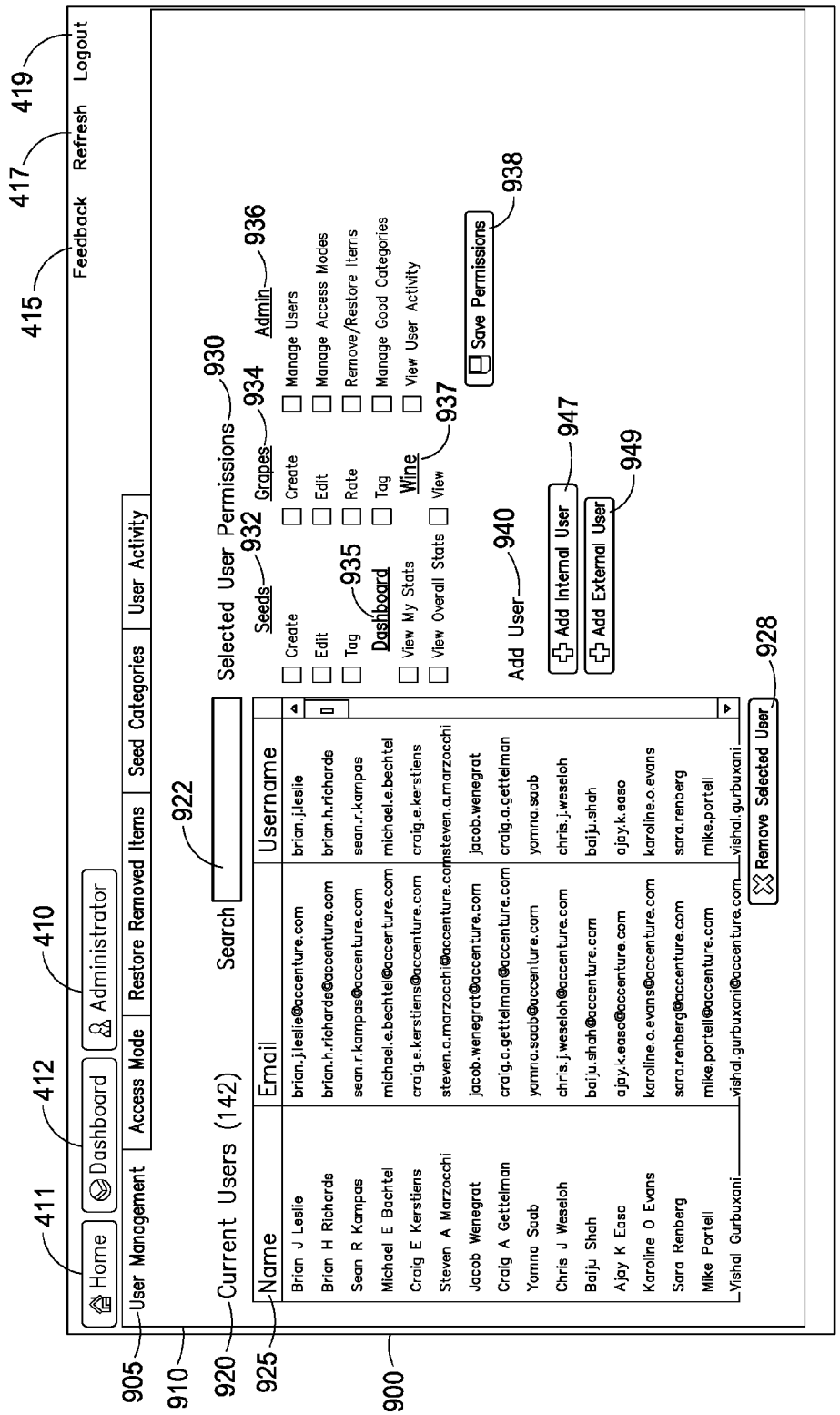
FIG. 9A is a screenshot of an alternative administrator interface in the system of FIG. 1, or other systems for providing an interface for collaborative innovation.

FIG. 9A is a screenshot of an alternative administrator interface 900 in the system of FIG. 1, or other systems for providing an interface for collaborative innovation. The system 100 may display the alternative administrator interface 900 to the user A 120A when the user A 120A clicks on the admin button 410. The user A 120A may use the alternative administrator interface 900 to view and modify the administrative data associated with the system 100. A user A 120A with administrator privileges may be taken directly to the alternative administrator interface 900 upon logging into the system 100. The administrator interface 900 may include an admin button 410, a home button 411, a dashboard button 412, a feedback link 415, a feedback link 417, a logout link 419, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape ideas permissions 934, admin ideas permissions 936, and a save permissions button 938. The add user subsection 940 may include an add internal user button 947 and an add external user button 949. The administrator interface may be designed using ADOBE FLEX ACCORDION. Each accordion may contain controls similar in nature.

In operation one of the users 120A-N with administrator privileges, such as the user A 120A, may user the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape idea permissions 934, the dashboard permissions 935, the admin permissions 936, and the wine permissions 937. The initial item permissions 932 may include create, edit, and tag permissions. The grape idea permissions 934 may include create, edit, rate, and tag permissions. The admin permissions 936 may include remove/restore grape ideas, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may click on the add internal user button 947 to add a new internal user and the add external user button 949 at add a new external user. An internal user may be a member of the organization or the collaborative environment while an external user may be a person external to the organization. The external users may, by default, be given more restrictive user permissions.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 10:
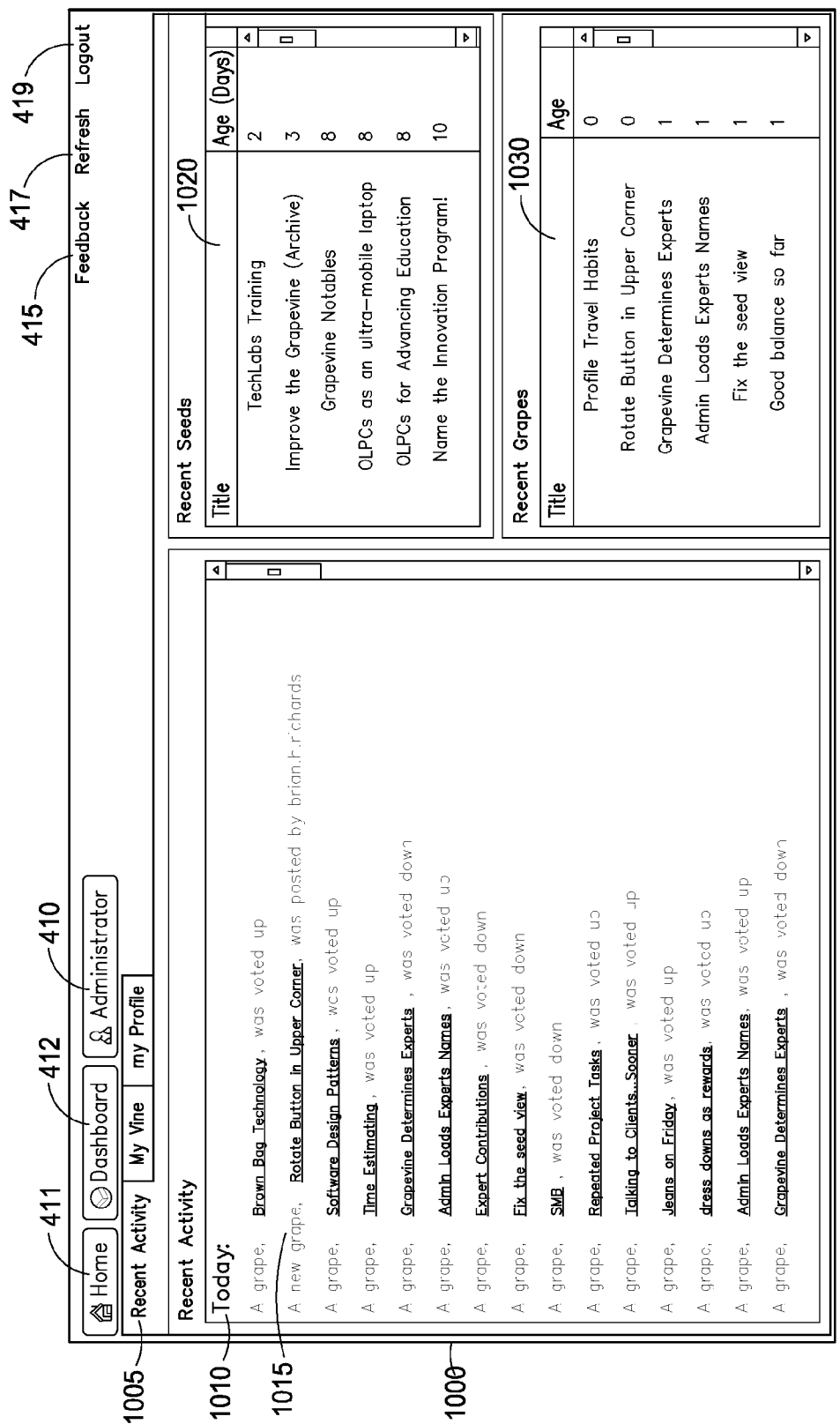
FIG. 10 is a screenshot of a recent activity screen in the system of FIG. 1, or other systems for providing an interface for collaborative innovation.

FIG. 10 is a screenshot of a recent activity screen 1000 in the system of FIG. 1, or other systems for providing an interface for collaborative innovation. The system 100 may display the recent activity screen 1000 to the user A 120A when the user A 120A clicks on the dashboard button 412 and then clicks on the recent activity tab 1005. Alternatively or in addition the system 100 may display the recent activity screen 1000 to the user A 120A when the user A 120A clicks on the dashboard button 412. The user A 120A may use the recent activity screen 1000 to view the recent activity in the system 100. The recent activity screen 1000 may include an admin button 410, a home button 411, a dashboard button 412, feedback link 415, a refresh link 417, a logout link 419, a recent activity display 1010, a recent seed table 1020 and a recent grape table 1030. The recent activity display 1010 may include a list of items or ideas.

In operation, the user A 120A may view the activity of the idea in the system in the recent activity display 1010. The recent activity display 1010 may indicate when a particular idea has received many positive ratings, or when a particular idea has received many negative ratings. The recent activity display 1010 may display the ideas, the activity on the ideas, and any associated information, such as the person who posted the idea. The user A 120A may click on one of the ideas to view the idea.

The recent seeds table 1020 may display the recent initial items added to the system 100. The user A 120A may click on one of the initial items to view the initial item. The recent seeds table 1020 may also display the age of the initial item. The recent grapes table 1030 may display the recent ideas added to the system. The recent grapes table 1030 may display the age of the ideas, such as in days. The user A 120A may click on one of the ideas to view, enhance, or rate the idea.

Figure 11:
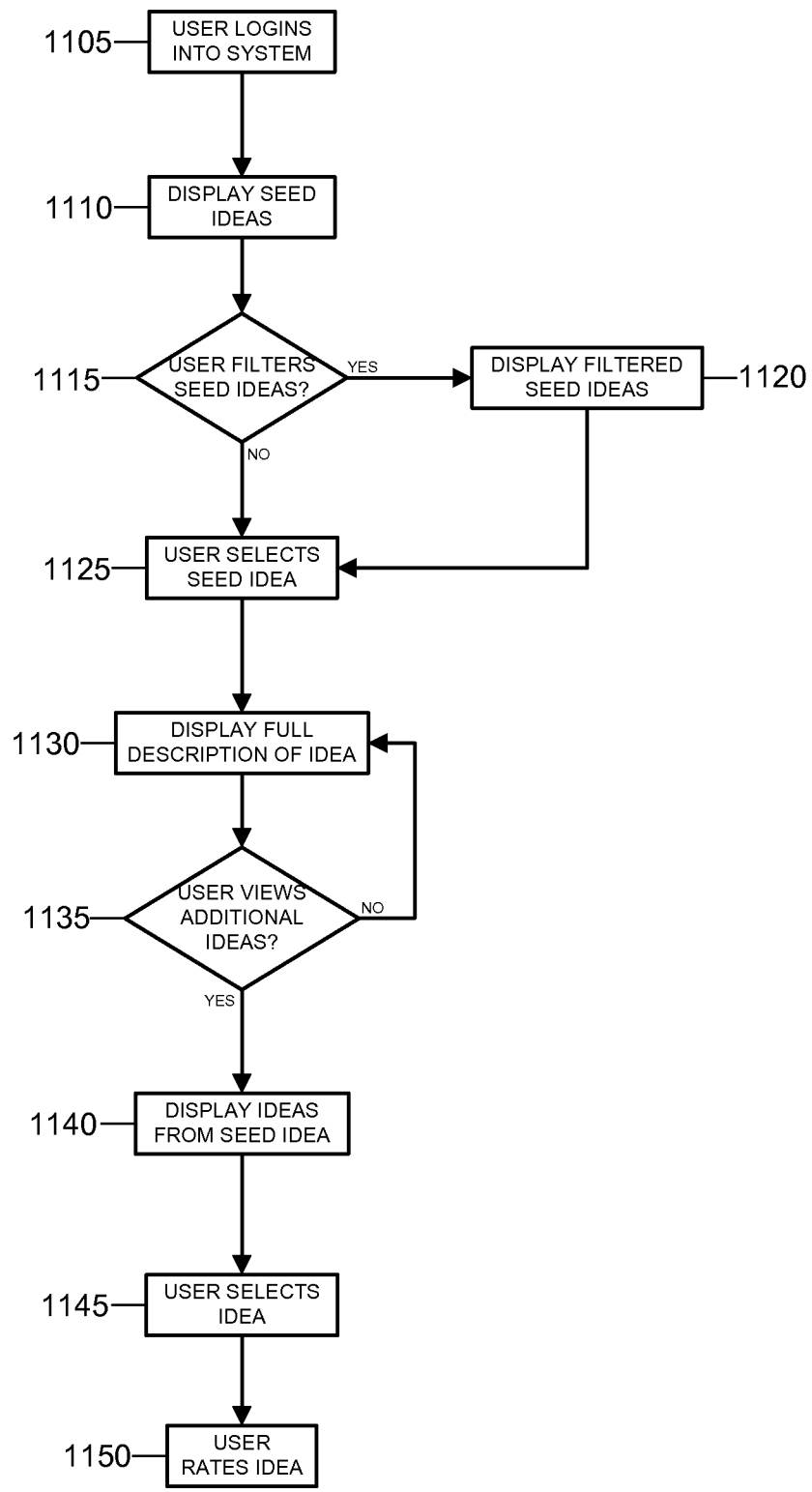
FIG. 11 is a flowchart illustrating the operations of rating an idea in the system of FIG. 1, or other systems for providing an interface for collaborative innovation.

FIG. 11 is a flowchart illustrating the operations of rating an idea in the system of FIG. 1, or other systems for providing an interface for collaborative innovation. At block 1105 one of the users 120A-N, such as the user A 120A, may log into the system 100, such as by using the user login interface 300. At block 1110 the system 100 may display the existing initial items to the user A 120A, such as in the initial item selection interface 400. At block 1115 the user A 120A may use the initial item selection interface 400 to filter the one or more displayed initial items. If the user A 120A chooses to filter the initial items then the system 100 moves to block 1120. At block 1120 the system 100 displays the filtered initial items to the user A 120A.

If the user A 120A does not filter the initial items at block 1115, the system 100 moves to block 1125. At block 1125 the user A 120A may use the initial item selection interface 400 to select an initial item. At block 1130 the system 100 may display the full description of the idea selected by the user A 120A, such as through the initial item details screen 500. At block 1135 the user A 120A may view the ideas innovated from the selected initial item. If at block 1135 the user A 120A does not choose to view the ideas innovated from the selected initial item, the system 100 may return to block 1130. If at block 1135 the user A 120A chooses to view the ideas innovated from the selected initial item the system 100 may move to block 1140.

At block 1140 the system 100 may display the ideas innovated from the initial item, such as via the initial item collaborative innovation screen 600. The ideas may be displayed as a tree-like structure in the graphical collaborative display 635. Each idea on the graphical collaborative display may be represented by a node, and each node may be connected via a link to the idea it was innovated from. At block 1145 the user A 120A may select an idea in the graphical collaborative display 635 of the initial item collaborative innovation screen 600. At block 1150 the user A 120A may indicate whether they like or dislike the idea, such as by clicking on the like it button 644 or the don't like it button 646. The system 100 may store whether the user A 120A likes or dislikes the selected idea in the data store 245. The data describing whether the user A 120A likes or dislikes the idea may be used to determine the rating of the idea.

Figure 12:
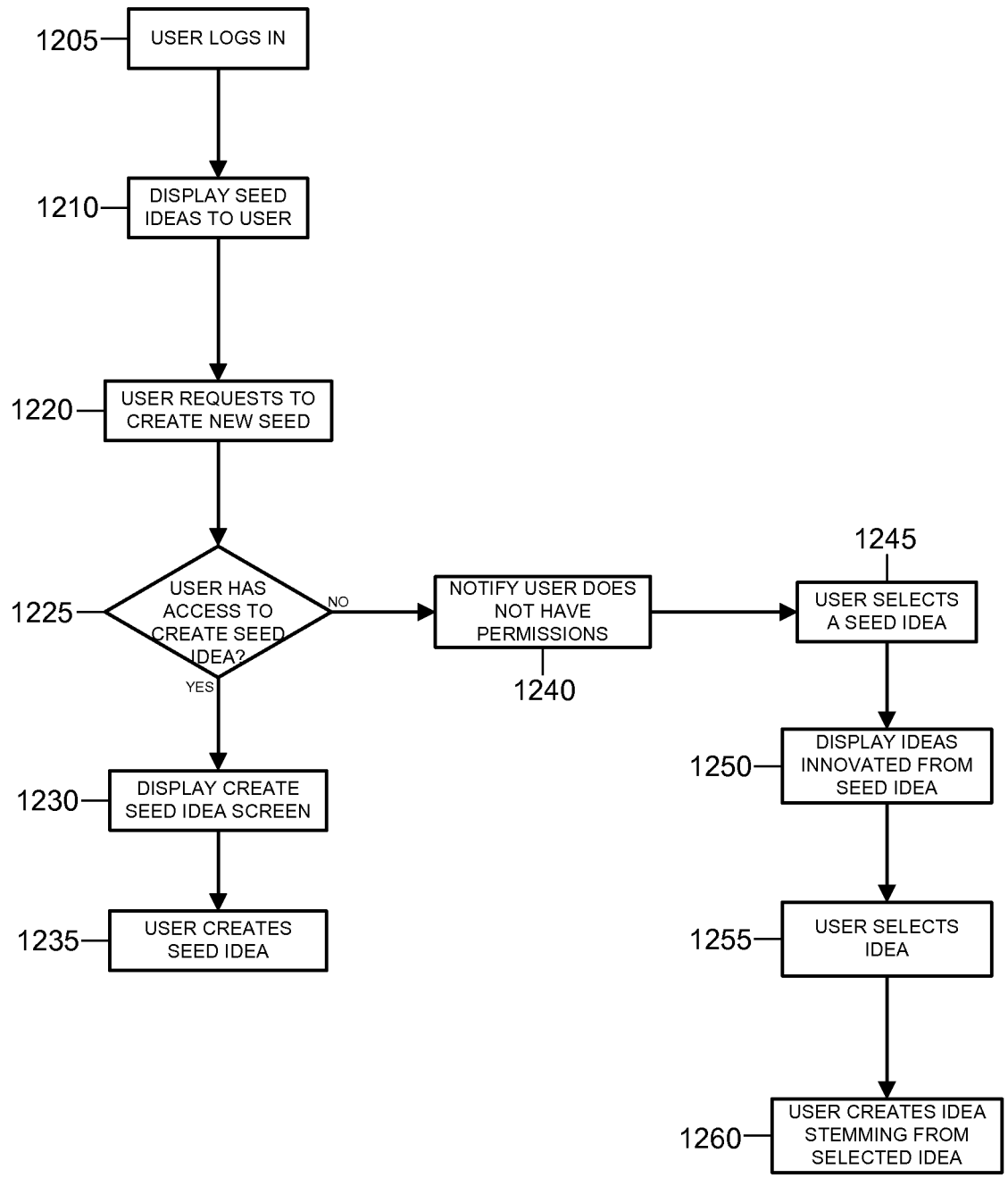
FIG. 12 is a flowchart illustrating the operations of creating an idea in the system of FIG. 1, or other systems for providing an interface for collaborative innovation.

FIG. 12 is a flowchart illustrating the operations of creating an idea in the system of FIG. 1, or other systems for providing an interface for collaborative innovation. At block 1205 one of the content providers 110A-N or one of the users 120A-N, such as the user A 120A, may log into the system 100, such as via the user login interface 300. The system 100 may display the existing initial items to the user A 120A, such as via the initial item selection interface 400. At block 1220, the user A 120A may request to create a new initial item, such as via the initial item selection interface 400. At block 1225 the system 100 may determine whether the user A 120A has sufficient permissions to create a new initial item. If the system 100 determines the user A 120A has sufficient permissions to create a new initial item, the system 100 may move to block 1230. At block 1230 the user A 120A may display a create initial item interface to the user A 120A. The create initial item interface may allow the user A 120A to create one or more initial items. At block 1235 the user A 120A may use the create new initial item interface to create a new initial item.

If at block 1225 the system 100 determines that the user A 120A does not have sufficient permissions to create a new initial item the system 100 may move to block 1240. At block 1240 the system 100 may notify the user A 120A that the user A 120A does not have the necessary permissions to create an initial item. The system 100 may then display the initial item selection interface 400, where the user may create an idea innovated from an existing idea or initial item. At block 1245 the user A 120A may select an initial item, such as from the initial item selection interface 400. At block 1250 the system 100 may display ideas innovated from the selected initial item, such as via the graphical collaborative display 635 of the initial item collaborative innovation screen 600. At block 1255 the user A 120A may select an idea the initial item collaborative innovation screen 600. The selected idea may be the initial item, or any idea innovated from the initial item. At block 1260 the user A 120A may create an idea innovated from the selected idea, such as by entering the idea into the idea enhancement field 648 and clicking the enhance button 652. Alternatively or in addition, an idea innovated from another idea may also be referred to as an enhancement of the initial idea.

Figure 13:
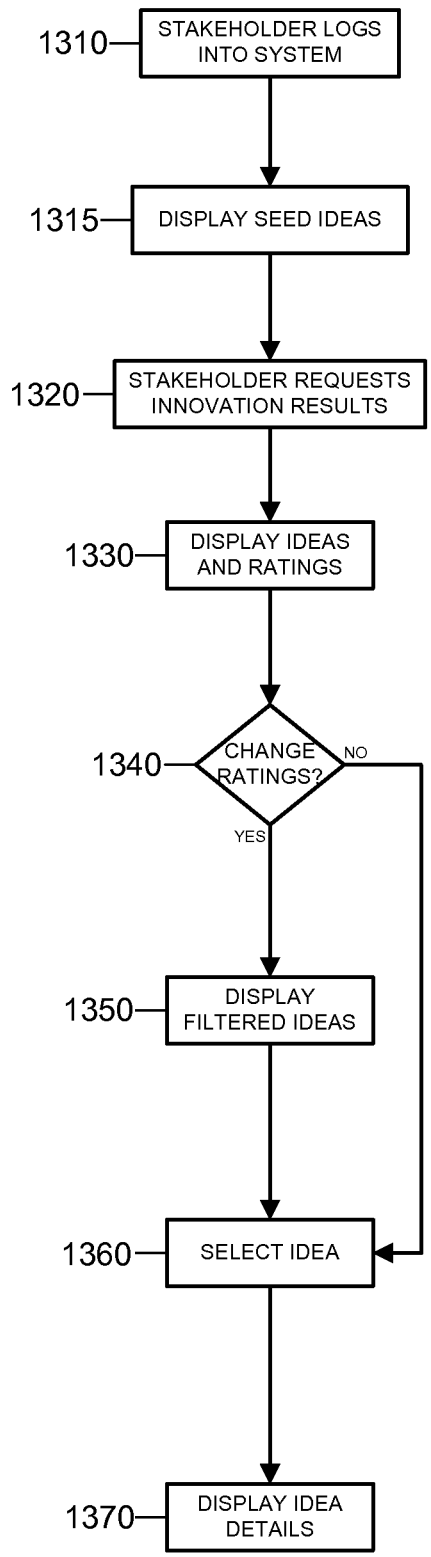
FIG. 13 is a flowchart illustrating the operations of viewing an initial item summary in the system of FIG. 1, or other systems for providing an interface for collaborative innovation.

FIG. 13 is a flowchart illustrating the operations of viewing an initial item summary in the system of FIG. 1, or other systems for providing an interface for collaborative innovation. At block 1310 one of the content providers 110A-N, such as the content provider A 110A, may log into the system 100, such as via the user login interface 300. Alternatively or in addition, one of the users 120A-N with proper permissions may log into the system 100. At block 1315 the system 100 may display the initial items to the content provider A 110A, such as via the initial item selection interface 400. At block 1320 the content provider A 110A may select an initial item and request to view the collaborative innovation results associated with the initial item.

At block 1330 the system 100 may display the results of the collaborative innovation process for the selected initial item. The results may be displayed as an ordered list of innovated ideas ordered based on the ratings received from the users 120A-N. Alternatively or in addition the ratings received from the users 120A-N may be used as one factor in an overall ratings calculation for each idea. Additional factors used in the ratings calculation may include the number of ratings the idea received, the number of views the idea received, the number of unique viewers of the idea, or generally any factor that may indicate the value of the idea. At block 1340 the content provider A 110A may change the weight applied to each factor incorporated in such a ratings calculation. If at block 1340 the content provider A 110A selects to change the weight applied to each factor in the ratings calculation, the system 100 may move to block 1250. At block 1350 the system 100 may re-calculate the rating of the ideas displayed in the results list in accordance with the weight for each factor identified by the content provider A 110A. If at block 1340 the content provider A 110A does not chose to re-weight the factors used in the rating calculation, the system 100 may move to block 1360.

At block 1360 the content provider A 110A may select an idea displayed in the results list. At block 1370 the system 100 may display the details associated with the idea to the content provider A 110A. The details may include a description of the idea, the rating of the idea, the date the idea was created, the creator of the idea, or generally any information that may be of value to the content provider A 110A.

Figure 14:
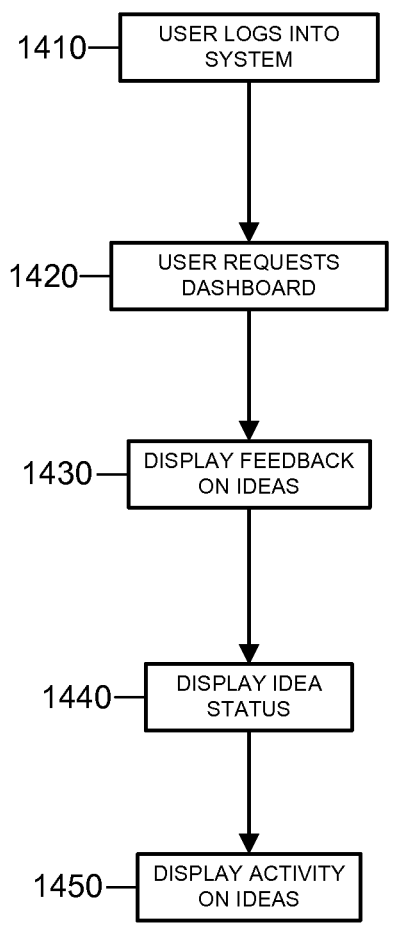
FIG. 14 is a flowchart illustrating the operations of displaying user dashboard information in the system of FIG. 1, or other systems for providing an interface for collaborative innovation.

FIG. 14 is a flowchart illustrating the operations of displaying user dashboard information in the system of FIG. 1, or other systems for providing an interface for collaborative innovation. At block 1410 the user A 120A may log into the system 100, such as via the user login interface 300. At block 1420 the user A 120A may request to view the user dashboard screen 800, such as by clicking on the dashboard button 412. At block 1430 the system 100 may display the feedback on ideas given by the user A 120A, such as via the user dashboard screen 800. The feedback on ideas given by the user A 120A may be displayed in one or more graphs, such as the feedback graph 814. At block 1440 the system 100 may display the idea status of the user A 120A, such as the current ideas of the user A 120A and/or the historical ideas of the user A 120A. At block 1450 the system 100 may display the activity on the ideas of the user A 120A. The activity on the ideas of the user A 120A may be displayed as one or more graphs. The activity on the ideas of the user A 120A may include data describing the feedback given by the other users 120B-N on the ideas of the user A 120A. The user A 120A may use the data displayed by the user dashboard screen 800 to manage their interactions with the system 100.

FIG. 15 illustrates a general computer system 1500, which may represent a service provider server 240, a third party server 250, the client applications 210A-N, 220A-N, or any of the other computing devices referenced herein. The computer system 1500 may include a set of instructions 1524 that may be executed to cause the computer system 1500 to perform any one or more of the methods or computer based functions disclosed herein. The computer system 1500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1524 (sequential or otherwise) that specify actions to be taken by that machine. In a particular embodiment, the computer system 1500 may be implemented using electronic devices that provide voice, video or data communication. Further, while a single computer system 1500 may be illustrated, the term "system" shall also be taken to include any collection of systems or subsystems that individually or jointly execute a set, or multiple sets, of instructions to perform one or more computer functions.

As illustrated in FIG. 15, the computer system 1500 may include a processor 1502, such as, a central processing unit (CPU), a graphics processing unit (GPU), or both. The processor 1502 may be a component in a variety of systems. For example, the processor 1502 may be part of a standard personal computer or a workstation. The processor 1502 may be one or more general processors, digital signal processors, application specific integrated circuits, field programmable gate arrays, servers, networks, digital circuits, analog circuits, combinations thereof, or other now known or later developed devices for analyzing and processing data. The processor 1502 may implement a software program, such as code generated manually (i.e., programmed).

The computer system 1500 may include a memory 1504 that can communicate via a bus 1508. The memory 1504 may be a main memory, a static memory, or a dynamic memory. The memory 1504 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1504 may include a cache or random access memory for the processor 1502. Alternatively or in addition, the memory 1504 may be separate from the processor 1502, such as a cache memory of a processor, the system memory, or other memory. The memory 1504 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1504 may be operable to store instructions 1524 executable by the processor 1502. The functions, acts or tasks illustrated in the figures or described herein may be performed by the programmed processor 1502 executing the instructions 1524 stored in the memory 1504. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1500 may further include a display 1514, such as a liquid crystal display (LCD), an organic light emitting diode (OLED), a flat panel display, a solid state display, a cathode ray tube (CRT), a projector, a printer or other now known or later developed display device for outputting determined information. The display 1514 may act as an interface for the user to see the functioning of the processor 1502, or specifically as an interface with the software stored in the memory 1504 or in the drive unit 1506.

Additionally, the computer system 1500 may include an input device 1512 configured to allow a user to interact with any of the components of system 1500. The input device 1512 may be a number pad, a keyboard, or a cursor control device, such as a mouse, or a joystick, touch screen display, remote control or any other device operative to interact with the system 1500.

The computer system 1500 may also include a disk or optical drive unit 1506. The disk drive unit 1506 may include a computer-readable medium 1522 in which one or more sets of instructions 1524, e.g. software, can be embedded. Further, the instructions 1524 may perform one or more of the methods or logic as described herein. The instructions 1524 may reside completely, or at least partially, within the memory 1504 and/or within the processor 1502 during execution by the computer system 1500. The memory 1504 and the processor 1502 also may include computer-readable media as discussed above.

The present disclosure contemplates a computer-readable medium 1522 that includes instructions 1524 or receives and executes instructions 1524 responsive to a propagated signal; so that a device connected to a network 235 may communicate voice, video, audio, images or any other data over the network 235. Further, the instructions 1524 may be transmitted or received over the network 235 via a communication interface 1518. The communication interface 1518 may be a part of the processor 1502 or may be a separate component. The communication interface 1518 may be created in software or may be a physical connection in hardware. The communication interface 1518 may be configured to connect with a network 235, external media, the display 1514, or any other components in system 1500, or combinations thereof. The connection with the network 235 may be a physical connection, such as a wired Ethernet connection or may be established wirelessly as discussed below. Likewise, the additional connections with other components of the system 1500 may be physical connections or may be established wirelessly. In the case of a service provider server 240 or the content provider servers 110A-N, the servers may communicate with users 120A-N through the communication interface 1518.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1522 may be a single medium, or the computer-readable medium 1522 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1522 may include a solid-state memory such as a memory card or other package that houses one or more non-volatile read-only memories. The computer-readable medium 1522 also may be a random access memory or other volatile re-writable memory. Additionally, the computer-readable medium 1522 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for providing an interface for collaborative innovation, the method comprising:
   providing a content provider interface to a content provider;
   receiving an item from a content provider via the content provider interface;
   providing a user interface to one or more users wherein the user interface allows the one or more users to create one or more primary responses linked with the item, create one or more secondary responses, and rate the primary and secondary responses, wherein each of the primary responses is directly related to the item, and wherein the item comprises a previously created primary response, a previously created secondary response, or a new item;
   receiving the one or more primary responses associated with the initial item and the one or more secondary responses associated with the primary responses from the one or more users via the user interface;
   displaying, via the user interface, a graphical hierarchical representation of the item, the one or more primary responses, an association between the one or more primary responses and the item, the one or more secondary responses, and an association between the one or more secondary responses and the one or more primary responses;
   displaying a full description of the item, the primary responses and the secondary responses selected for rating;
   receiving input through the graphical hierarchical representation of the displayed user interface, which rates the primary and secondary responses; and
   providing the primary and secondary responses to the content provider via the content provider interface wherein the primary and secondary responses are ordered based on an overall rating calculation applied to each of the primary and secondary responses;
   displaying in the content provider interface a plurality of adjustable weight selectors for setting weights applied to a respective plurality of factors that are utilized in calculating an overall rating for each of the primary and secondary responses, wherein at least one of the respective plurality of factors includes ratings of user ideas in the one or more primary responses and the one or more secondary responses received from the one or more users via the user interface, the plurality of factors comprising of a percentage of users who liked a response, a number of ratings provided for a response and a number of views of a response;
   displaying in the content provider interface a weighting reset button;
   modifying the weights applied to the respective plurality of overall rating calculation factors and re-calculating the overall rating for each of the primary and secondary responses responsive to the input obtained from the one or more displayed plurality of adjustable weight selectors and input received from the displayed weighting reset button in the content provider interface; and
   displaying in the content provider interface the primary and secondary responses ordered based on the modified weights and the recalculation of the overall rating for each of the primary and secondary responses.

2. The method of claim 1 wherein the interface is accessible via a web browser.

3. The method of claim 1 wherein the interface comprises a rich internet application.

4. The method of claim 1 wherein the item comprises a question.

5. The method of claim 4 wherein at least one of the one or more primary responses comprises an answer to the question.

6. The method of claim 1 wherein the one or more ratings indicate whether the one or more users like the one or more primary and secondary responses.

7. A method for providing an interface for displaying a graphical representation of associated items, the method comprising:
   providing an interface for receiving and displaying items;
   receiving a first item via the interface;
   receiving at plurality of second items associated with the first item via the interface;
   displaying, via the interface, a graphical representation of the first item, the plurality of second items and an association between the first item and each of the second items;
   receiving one or more primary responses linked with the first item, and one or more secondary responses;
   displaying a full description of the item, the primary responses and the secondary responses selected for rating;
   allowing a plurality of users to rate the primary responses and the secondary responses through the graphical hierarchical representation, wherein each of the primary responses is directly related to the first item, and wherein the first item comprises a previously created primary response, a previously created secondary response, or a new item; and
ordering the primary and secondary responses based on an overall rating calculation applied to each of the primary and secondary responses;
   displaying in the content provider interface a plurality of adjustable weight selectors for setting weights applied to a respective plurality of factors that are utilized in calculating an overall rating for each of the primary and secondary responses, wherein at least one of the respective plurality of factors includes ratings of user ideas in the one or more primary responses and the one or more secondary responses received from the one or more users via the user interface, the plurality of factors comprising of a percentage of users who liked a response, a number of ratings provided for a response and a number of views of a response;
   displaying in the content provider interface a weighting reset button;

modifying the weights applied to the respective plurality of overall rating calculation factors and re-calculating the overall rating for each of the primary and secondary responses responsive to the input obtained from the one or more displayed plurality of adjustable weight selectors and input received from the displayed weighting reset button in the content provider interface; and displaying in the content provider interface the primary and secondary responses ordered based on the modified weights and the recalculation of the overall rating for each of the primary and secondary responses.

8. The method of claim 7 further comprising:

receiving a plurality of third items associated with the plurality of second items, wherein each third item is associated with at least one second item; and displaying, via the interface, a graphical representation of the first item, the plurality of second items, the plurality of third items, the association between the first item the plurality of second items, and an association between the plurality of second items and the plurality of third items.

9. The method of claim 7 wherein the graphical representation comprises a tree-like structure.

10. The method of claim 7 further comprising:

allowing a user to select one of the items in the graphical representation via the interface; and displaying via the interface additional information related to the selected item.

11. The method of claim 10 further comprising receiving input through the graphical hierarchical representation of the displayed user interface, which rates the selected item.

12. The method of claim 7 wherein the interface is accessible via a web browser.

13. A system for providing an interface for collaborative innovation, the system comprising:

means for providing a content provider interface to one or more content provider users;

means for receiving an item from a content provider into a memory coupled to a processor;

means for providing an interface to one or more users comprising processor executable instructions in the memory that when executed by the processor provides the interface, wherein the interface is coupled to the memory and allows the one or more users to:

create one or more primary responses linked with the item;

create one or more secondary responses; and rate the primary and secondary responses, wherein each of the primary responses is directly related to the item, and wherein the item comprises a previously created primary response, a previously created secondary response, or a new item;

means for receiving, into the memory, the one or more primary responses associated with the initial item and the one or more secondary responses associated with the primary responses via the interface;

means for displaying, via the interface, a graphical hierarchical representation of the item, the one or more primary responses, an association between the one or more primary responses and the item, the one or more secondary responses, and an association between the one or more secondary responses and the one or more primary responses;

means for displaying a full description of the item, the primary responses and the secondary responses selected for rating;

means for allowing the plurality of users to rate the primary and secondary responses through the graphical hierarchical representation, and storing into the memory ratings received for the primary and secondary responses; and means for providing the primary and secondary responses to the content provider comprising the processor executable instructions that when executed by the processor further cause the processor to provide the primary and secondary responses, wherein the primary and secondary responses are ordered based on an overall rating calculation applied to each of the primary and secondary responses;

means for displaying via the content provider interface a plurality of adjustable weight selectors for setting weights applied to a respective plurality of factors that are utilized in calculating an overall rating for each of the primary and secondary responses, wherein at least one of the respective plurality of factors includes the ratings of user ideas received in the primary and secondary responses from the one or more users via the interface, the plurality of factors comprising of a percentage of users who liked a response, a number of ratings provided for a response and a number of views of a response;

means for displaying via the content provider interface a weighting reset button;

means for modifying the weights applied to the respective plurality of overall rating calculation factors and re-calculating the overall rating for each of the primary and secondary responses responsive to the input obtained from the one or more displayed plurality of adjustable weight selectors and input received from the displayed weighting reset button in the content provider interface; and means for displaying via the content provider interface the primary and secondary responses ordered based on the modified weights and the recalculation of the overall rating for each of the primary and secondary responses.

14. The system of claim 13 wherein the one or more ratings indicate whether the one or more users like the one or more primary and secondary responses.

15. The system of claim 13 wherein the interface is accessible via a web browser.

16. The system of claim 13 wherein the interface comprises a rich internet application.

17. The system of claim 13 wherein the item comprises a question.

18. The system of claim 17 wherein at least one of the one or more primary responses comprises an answer to the question.

19. A system for providing an interface for collaborative innovation, the system comprising:

a memory to store an item, one or more primary responses, one or more secondary responses, and one or more ratings;

an interface operatively connected to the memory, the interface operative to:

communicate with a content provider and one or more users, allow the one or more users to create one or more primary responses linked with the item, allow the users to create one or more secondary responses, and allow the one or more users to provide ratings of the one or more primary responses and the one or more secondary responses, wherein the one or more primary responses are directly related to the item, and wherein the item comprises a previously created primary response, a previously created secondary response, or a new item; and a processor operatively connected to the memory and the interface, the processor operative to:
- receive the item from the content provider, provide the interface to the one or more users,
- receive the one or more primary responses associated with the item, and the one or more secondary responses associated with the primary responses from the one or more users via the interface,
- display, via the interface, a graphical hierarchical representation of the item, the one or more primary responses, an association between the one or more primary response and the item, the one or more secondary responses, and an association between the one or more secondary responses and the one or more primary responses,
- display a full description of the item, the primary responses and the secondary responses selected for rating,
- allow the plurality of users to rate the primary and secondary responses through the graphical hierarchical representation, and
- provide via the interface, the primary and secondary responses to the content provider wherein the primary and secondary responses are ordered based on an overall rating calculation applied to each of the primary and secondary responses;
- display via the interface, a plurality of adjustable weight selectors for setting weights applied to a respective plurality of factors that are utilized in calculating an overall rating for each of the primary and secondary responses, wherein at least one of the respective plurality of factors includes ratings of user ideas in the primary and secondary responses rated by the one or more users via the interface, the plurality of factors comprising of a percentage of users who liked a response, a number of ratings provided for a response and a number of views of a response;
- displaying via the interface, a weighting reset button;
- modify the weights applied to the respective plurality of overall rating calculation factors and re-calculating the overall rating for each of the primary and secondary responses responsive to the input obtained from the one or more displayed plurality of adjustable weight selectors and input received from the displayed weighting reset button via the interface; and
- display via the interface the primary and secondary responses ordered based on the modified weights and the recalculation of the overall rating for each of the primary and secondary responses.

20. The system of claim 19 wherein the interface is accessible via a web browser.

21. The system of claim 19 wherein the interface comprises a rich internet application.

22. The system of claim 19 wherein the item comprises a question.

23. The system of claim 22 wherein at least one of the one or more primary responses comprises an answer to the question.

* * * * *